(12) United States Patent
Kim

(10) Patent No.: US 12,118,161 B2
(45) Date of Patent: Oct. 15, 2024

(54) DISPLAY DEVICE AND METHOD OF MANUFACTURING THE SAME

(71) Applicant: Samsung Display Co., LTD., Yongin-si (KR)

(72) Inventor: Dong Hyun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/314,295

(22) Filed: May 9, 2023

(65) Prior Publication Data

US 2024/0103659 A1  Mar. 28, 2024

(30) Foreign Application Priority Data

Sep. 23, 2022 (KR) ................ 10-2022-0120430

(51) Int. Cl.
*G06F 3/041* (2006.01)
*G06F 3/044* (2006.01)
*H01B 7/04* (2006.01)

(52) U.S. Cl.
CPC ........ *G06F 3/04164* (2019.05); *G06F 3/0412* (2013.01); *G06F 3/0443* (2019.05); *G06F 3/0446* (2019.05); *H01B 7/04* (2013.01); *G06F 2203/04102* (2013.01); *G06F 2203/04111* (2013.01)

(58) Field of Classification Search
None
See application file for complete search history.

(56) References Cited

U.S. PATENT DOCUMENTS

2017/0196102 A1* 7/2017 Shin .................. G06F 1/1605
2018/0131908 A1* 5/2018 Salter ................ G06F 3/0445

FOREIGN PATENT DOCUMENTS

| CN | 110209240 A | * | 9/2019 | ........... G06F 1/1652 |
| KR | 10-1734828 | | 5/2017 | |
| KR | 10-2021-0084187 | | 7/2021 | |
| KR | 10-2379189 | | 3/2022 | |
| WO | WO-2005020190 A2 | * | 3/2005 | ........... G06F 1/1601 |

* cited by examiner

*Primary Examiner* — Duane N Taylor, Jr.
(74) *Attorney, Agent, or Firm* — KILE PARK REED & HOUTTEMAN PLLC

(57) ABSTRACT

A display device includes a first forward roll, a second forward roll, a third forward roll, a rotary shaft in a housing and spaced apart from the third forward roll, and a display panel engaging with the rotary shaft, the first forward roll, the second forward roll, and the third forward roll to be inserted into, or retracted from, the housing, the display panel includes a main display region, retracted from the housing through a first opening to display an image, a first sub-region, extending from the first forward roll to the second forward roll, a sub-display region, extending from the second forward roll to the third forward roll and overlapping a second opening in a plan view to display an image, and a second sub-region, extending from the third forward roll to the rotary shaft and wound on an outside of the rotary shaft.

23 Claims, 18 Drawing Sheets

DISPLAY DEVICE AND METHOD OF MANUFACTURING THE SAME

CROSS-REFERENCE TO RELATED APPLICATION(S)

This application claims priority to and benefits of Korean Patent Application No. 10-2022-0120430 under 35 U.S.C. § 119 filed on Sep. 23, 2022 in the Korean Intellectual Property Office, the entire contents of which are incorporated herein by reference.

BACKGROUND

1. Technical Field

The disclosure relates to a display device and a method of manufacturing the same.

2. Description of the Related Art

Display devices are becoming more important with developments in multimedia technology. Accordingly, various display devices such as an organic light-emitting diode (OLED) display device, a liquid crystal display (LCD) device, and the like have been used.

A display device may include a display panel such as an organic light-emitting display panel or an LCD panel. A light-emitting display panel may include light-emitting elements such as, for example, light-emitting diodes (LEDs). Examples of the LEDs include organic LEDs (OLEDs) using an organic material as a fluorescent material and inorganic LEDs using an inorganic material as a fluorescent material.

Recently, flexible display devices have been commercialized. A flexible display device can reproduce an input image on the screen of a display panel where OLEDs are formed, and the plastic OLEDs may be formed on a flexible plastic substrate. Flexible display devices can realize a variety of designs and have an excellent portability and durability. Flexible display devices can be implemented as various types of display devices, such as a bendable display device, a foldable display device, and a rollable display device. Flexible display devices can be applied not only to mobile devices such as smartphones and tablet personal computers (PCs), but also to televisions (TVs), automobile display devices, or wearable devices, and the area of application of flexible display devices is expanding.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device capable of displaying an image not only by unwinding a display panel from a housing, which surrounds the display panel, but also by using an opening formed in the housing, and also capable of improving structural reliability by separating a touch sensor unit, which seals the opening, from the display panel.

Aspects of the disclosure also provide a display device capable of displaying an image not only by unwinding a display panel from a housing, which surrounds the display panel, but also by using an opening formed in the housing and also capable of securing the surface quality of part of the display panel, exposed through the opening.

However, aspects of the disclosure are not restricted to those set forth herein. The above and other aspects of the disclosure will become more apparent to one of ordinary skill in the art to which the disclosure pertains by referencing the detailed description of the disclosure given below.

An embodiment of a display device may include a housing including a first surface including a first opening, and a second surface including a second opening; a rotary shaft disposed in the housing; a display panel wound on an outside of the rotary shaft and inserted into, or retracted from, the housing through the first opening; a touch sensor disposed in the second opening and spaced apart from the display panel; and a driver disposed in the housing and electrically connected to the display panel and the touch sensor, wherein the touch sensor is transparent with respect to visible light, the display panel may include a main display region that displays an image through the first opening; and a sub-display region that overlaps the touch sensor in a plan view and displays an image, and the driver controls touch stimulation applied to the touch sensor to be compatible with the image displayed in the sub-display region.

The driver may define the sub-display region by sensing a length by which the display panel is wound on an outside of the rotary shaft.

The display panel may extend in a direction and is electrically connected to a printed circuit board, protruding beyond the display panel, on both sides of the display panel, and the printed circuit board is embedded in the rotary shaft.

The printed circuit board may include a first protruding portion that protrudes from a side of the display panel, and a second protruding portion that protrudes from another side of the display panel, the touch sensor is electrically connected to the first protruding portion, and the second protruding portion is electrically connected to the driver.

The touch sensor may be electrically connected to the printed circuit board through a first flexible cable disposed in the housing, and the driver is electrically connected to the printed circuit board through a second flexible cable disposed in the housing.

An end of the first flexible cable may be electrically connected to the touch sensor, another end of the first flexible cable is electrically connected to the first protruding portion of the printed circuit board, an end of the second flexible cable is electrically connected to the driver, and another end of the second flexible cable is electrically connected to the second protruding portion of the printed circuit board.

The rotary shaft may be not visible due to the second surface of the housing.

The touch sensor may completely seal the second opening of the second surface of the housing.

The touch sensor may include a first substrate, touch electrodes, disposed on the first substrate; and a second substrate disposed on the touch electrodes.

The display device may further include an air gap disposed between the touch sensor and the sub-display region.

The first substrate and the second substrate of the touch sensor may each include a rigid material.

The first substrate and the second substrate may each include glass and/or quartz.

The display panel may include a display substrate including polyimide.

An embodiment of a display device may include a display device including a housing including a first surface including a first opening, the first surface being disposed on a first side of the housing in a first direction of the housing, and a second surface including a second opening, in a second direction of the housing, the second direction intersecting the first direction; a first forward roll adjacent to the first opening, in the housing; a second forward roll spaced apart from the first opening in the second direction, in the housing, and adjacent to the second opening; a third forward roll spaced apart from the second opening in the first direction, in the housing, and adjacent to the second opening; a rotary shaft disposed in the housing and spaced apart from the third forward roll and the second opening in the second direction; and a display panel engaging with the rotary shaft, the first forward roll, the second forward roll, and the third forward roll to be inserted into, or retracted from, the housing in the first direction through the first opening, wherein the display panel may include a main display region, that is retracted from the housing through the first opening to display an image; a first sub-region, extending from the first forward roll to the second forward roll, a sub-display region, extending from the second forward roll to the third forward roll and overlapping the second opening in a plan view to display an image, and a second sub-region, extending from the third forward roll to the rotary shaft and wound on an outside of the rotary shaft.

The display panel may have a display surface, and a base surface, is opposite to the display surface, the first forward roll is disposed on the display surface, and the second forward roll and the third forward roll are disposed on the base surface.

The rotary shaft may include a cut groove accommodating an end of the second sub-region of the display panel.

The main display region of the display panel may be inserted into the housing in case that the second sub-region of the display panel is wound on an outside of the rotary shaft.

The first surface may include a third opening, overlapping the first sub-region in a plan view, and the first sub-region displays an image through the third opening of the first surface of the housing.

The display device may further include a touch sensor completely sealing the second opening, wherein the touch sensor is transparent with respect to visible light.

The display device may further include an air gap disposed between the touch sensor and the sub-display region.

According to the aforementioned and other embodiments of the disclosure, an image can be displayed not only unwinding a display panel from a housing, which surrounds the display panel, but also by using an opening formed in the housing, and structural reliability can be improved by separating a touch sensor unit, which seals the opening, from the display panel.

Also, the surface quality of part of the display panel, exposed through the opening, can be secured.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
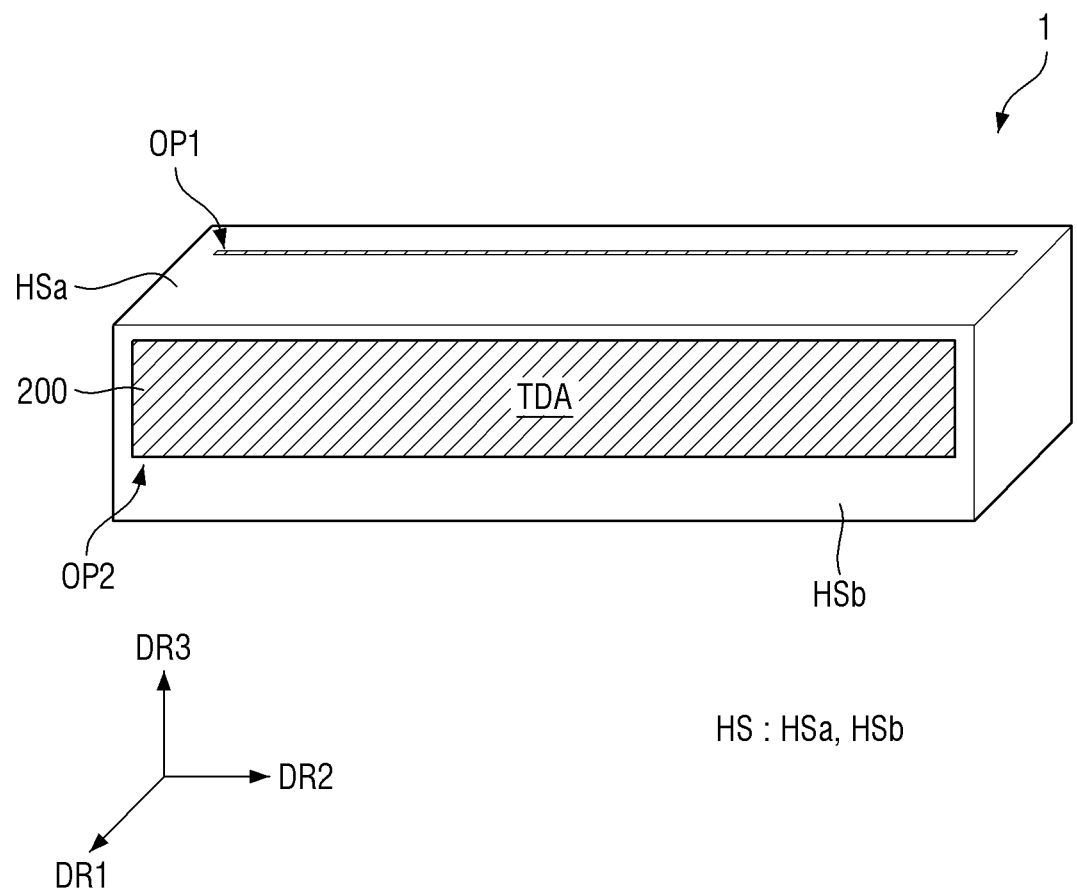
FIG. 1 is a schematic perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification.

In the drawings, sizes, thicknesses, ratios, and dimensions of the elements may be exaggerated for ease of description and for clarity.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Each of the various embodiments may be partially or wholly capable of various combinations or combining with each other, and each embodiment may be performed independently with respect to each other or may be implemented together.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Embodiments will hereinafter be described with reference to the attached drawings.

Figure 2:
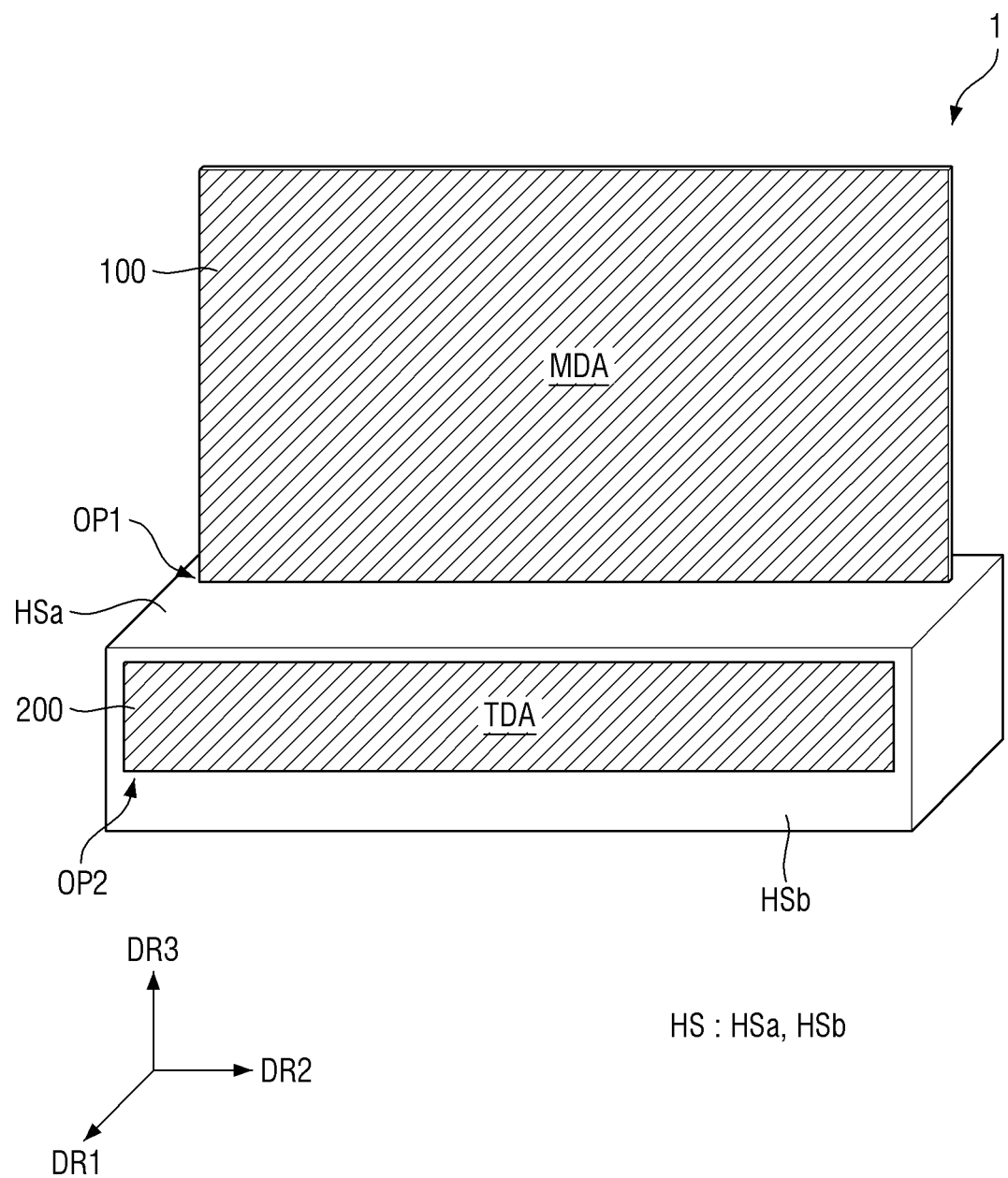
FIG. 2 is a schematic perspective view illustrating the display device of FIG. 1 with a display panel unwound.

FIG. 1 is a schematic perspective view of a display device according to an embodiment. FIG. 2 is a schematic perspective view illustrating the display device of FIG. 1 with a display panel unwound.

Referring to FIG. 1, first, second, and third directions DR1, DR2, and DR3 are defined as illustrated in FIG. 1. Referring to FIG. 1, the first and second directions DRI and DR2 may be orthogonal to each other, the first and third directions DR1 and DR3 may be orthogonal to each other, and the second and third directions DR2 and DR3 may be orthogonal to each other. The first direction DR1 may be understood as being a vertical direction, the second direction DR2 may be understood as being a horizontal direction, and the third direction DR3 may be understood as being a top-to-bottom direction. The term "direction," as used herein, may refer to both sides in each particular direction. If needed, one side or a side in a particular direction may be referred to as a first side in the particular direction, and the other side or another side in the particular direction may be referred to as a second side in the particular direction. Referring to FIG. 1, a side in each direction, pointed to by each arrow may be referred to as, but is not limited to, a first side, and the opposite side may be referred to as, but is not limited to, a second side.

For convenience, a surface of the display device 1 (or each element of the display device 1) that faces a direction in which an image is displayed may be referred to as a display surface, and the opposite surface of the display device 1 may be referred to as a base surface. However, the disclosure is not limited thereto. As an example, the surfaces of the display device 1 may also be referred to as a front side and a rear side or as a first surface and a second surface. In case that describing the relative location of each element of the display device 1, an element on a first side, in the third direction DR3, of another element may also be referred to as being above the other element, and an element on a second side, in the third direction DR3, of another element may also be referred to as being below the other element.

Referring to FIGS. 1 and 2, examples of the display device 1 include a variety of electronic devices providing a display screen. Examples of the display device 1 include, but are not limited to, a mobile phone, a smartphone, a tablet personal computer (PC), a mobile communication terminal, an electronic notepad, an electronic book reader, a personal digital assistant (PDA), a portable multimedia player (PMP), a navigation system, an ultramobile PC (UMPC), a television (TV), a gaming console, a wristwatch-type electronic device, a head mounted display (HMD), a monitor, a notebook computer, an automobile dashboard, a digital camera, a camcorder, an electronic billboard, medical equipment, inspection equipment, various home appliances (such as a refrigerator or a washing machine with a display area), and an Internet-of-Things (IoT) device. The display device 1 may be, for example, a smartphone, a tablet PC, or a notebook computer, but the disclosure is not limited thereto.

The display device 1 may include a display panel 100, which displays an image, a touch sensor unit or touch sensor 200, and a housing HS, in which the display panel 100 and the touch sensor unit 200 are received. The display device 1 may be a rollable display device having a display panel 100 wound into, or unwound from, the housing HS. For example, flexibility may be provided to the display panel 100 of the display device 1 so that the rolling (or winding) and unrolling (or unwinding) of the display panel 100 may be repeatedly performed with ease. For convenience, a state in which the display panel 100 is embedded in the housing HS and is not exposed from a first opening OP1 of the housing HS, as illustrated in FIG. 1, will hereinafter be is referred to as a "first state," and a state in which the display panel 100 is exposed from the first opening OP1 of the housing HS to form a main display part MDA, as illustrated in FIG. 2 will hereinafter be referred to as a "second state."

The housing HS may generally have a rectangular parallelepiped shape, but the disclosure is not limited thereto. For example, the housing HS may have a cylindrical shape. The housing HS is illustrated in FIGS. 1 and 2 as having a rectangular parallelepiped shape. The housing HS may have a first surface HSa, which is a surface on a first side, in the third direction DR3, of the housing HS, and a second surface HSb, which is a surface on a first side, in the first direction DR1, of the housing HS.

The first opening OP1, through which the display panel 100 is inserted into, or retracted from, the housing HS, may be formed on the first surface HSa of the housing HS, and a second opening OP2, through which part of the display panel 100 is exposed, may be formed on the second surface HSb of the housing HS.

The display device 1 may include the main display part MDA and a touch display part TDA. The main display part MDA of the display device 1 may be an area in which an image is displayed in response to part of the display panel 100 being inserted into, or retracted from, the housing HS through the first opening OP1, and the touch display part TDA of the display device 1 may be an area in which the touch sensor unit 200 detects touch electrodes and part of the display panel 100 exposed through the second opening OP2 of the housing HS overlaps the touch sensor unit 200 in the first direction DR1.

The internal structure of the display device 1 will hereinafter be described.

Figure 3:
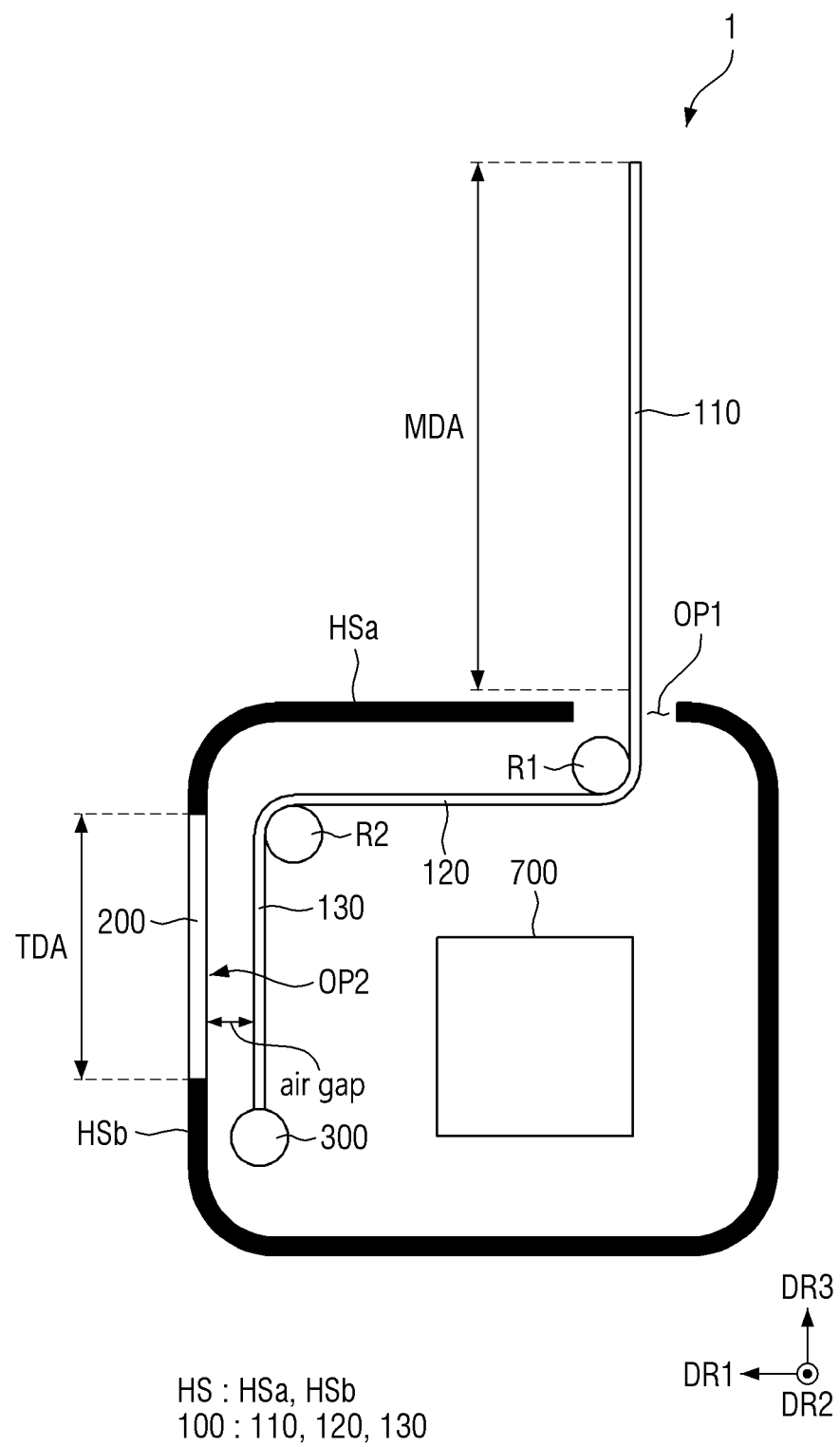
FIG. 3 is a schematic cross-sectional view illustrating the internal structure of a housing of the display device of FIG. 1.
Figure 4:
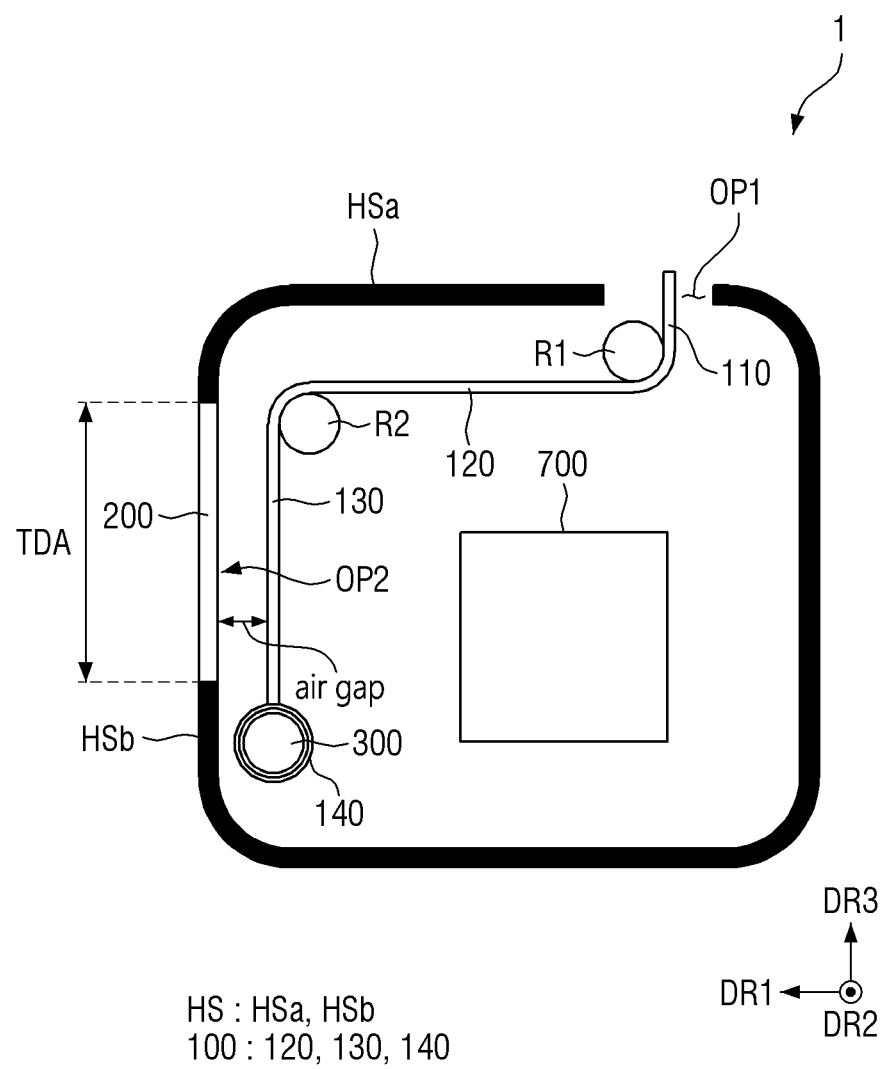
FIG. 4 is a schematic cross-sectional view illustrating the display device of FIG. 1 with the display panel wound.
Figure 5:
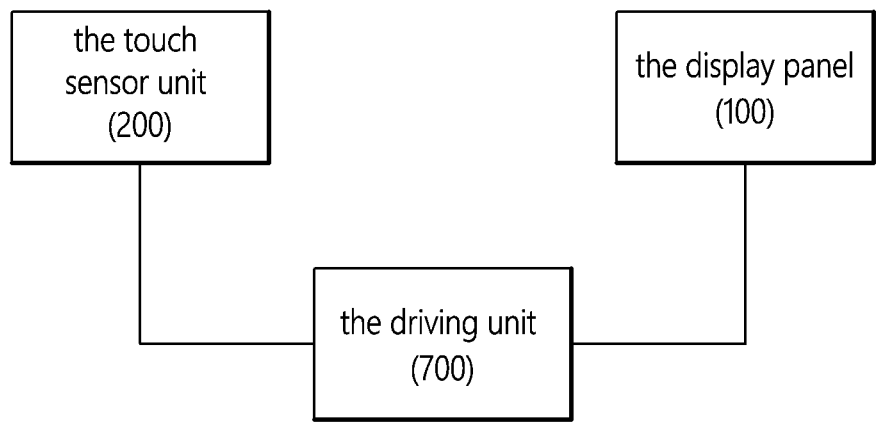
FIG. 5 is a block diagram of the display device of FIG. 1.

FIG. 3 is a schematic cross-sectional view illustrating the internal structure of the housing of the display device of FIG. 1. FIG. 4 is a schematic cross-sectional view illustrating the display device of FIG. 1 with the display panel wound. FIG. 5 is a block diagram of the display device of FIG. 1.

Referring to FIGS. 3 through 5, the display device 1 may include the housing HS, the display panel 100, the touch sensor unit 200, a rotary shaft 300, a driving unit or driver 700, a first forward roll R1, and a second forward roll R2.

The housing HS may accommodate the display panel 100, the rotary shaft 300, the driving unit 700, the first forward roll R1, and the second forward roll R2 therein. In an embodiment, the housing HS may have a three-dimensional (3D) shape similar to a rectangular parallelepiped, but the disclosure is not limited thereto. In an embodiment, the corners of the housing HS may be rounded, but the disclosure is not limited thereto. The housing HS is illustrated in FIGS. 3 and 4 as having rounded corners.

The first opening OP1 may be formed in the first surface HSa, for example, on the surface on the first side, in the third direction DR3, of the housing HS. The first opening OP1, which penetrates the first surface HSa, may be a passage through which a first portion 110 of the display panel 100 is inserted into, or retracted from, the housing HS.

The second opening OP2 may be formed in the second surface HSb, for example, on the surface on the first side, in the first direction DR1, of the housing HS. The second opening OP2, which penetrates the second surface HSb, may expose a third portion 130 of the display panel 100 and may thus allow the third portion 130 to be visible to a user.

The second opening OP2 may be sealed by the touch sensor unit 200. For example, the touch sensor unit 200 may engage completely with the second opening OP2 so that the inside of the housing HS may be separated from the outside by the second opening OP2. In other words, in a case where the touch sensor unit 200 is transparent with respect to visible light, the third portion 130 of the display panel 100 may be visible to the user through the second opening OP2, but may be separated from the outside by the touch sensor unit 200.

The rotary shaft 300 may be disposed in the housing HS and may provide power for winding or unwinding the display panel 100. For example, one end or an end of the display panel 100 may be connected to the rotary shaft 300 so that the display panel 100 may be wound around the rotary shaft 300 as the rotary shaft 300 rotates with the display device 1 being in the first state and may be unwound from the rotary shaft 300 as the rotary shaft 300 rotates with the display device 1 being in the first state. The rotary shaft 300 may have a cylindrical shape extending in the second direction DR2. The structure of the rotary shaft 300 will be described later.

The rotary shaft 300 may not be visible to the user due to the second surface HSb of the housing HS. In other words, the rotary shaft 300 may not overlap the second opening OP2, which is formed in the second surface HSb of the housing HS, in the first direction DR1. As a result, interference that may be applied, during the rotation of the rotary shaft 300, to part of the display surface of the display panel 100 that becomes visible through the second opening OP2 can be reduced, and the display quality of the touch display part TDA of the display device 1 can be secured.

The first and second forward rolls R1 and R2 may allow the display panel 100 to be received in the housing HS, in a state of being bent. For example, the first and second forward rolls R1 and R2 may be spaced apart from each other in the first direction DR1, and the display panel 100 may be bent at least once at the first forward roll R1 and at least once at the second forward roll R2.

The first and second forward rolls R1 and R2 may not be aligned with each other in the first direction DR1. For example, the centers of the first and second forward rolls R1 and R2 may not fall on a straight line parallel to the first direction DR1. The centers of the first and second forward rolls R1 and R2 may be spaced apart from each other in the third direction DR3. In an embodiment, the first forward roll R1 may be disposed on the display surface of the display panel 100, and the second forward roll R2 may be disposed on the base surface of the display panel 100. However, the disclosure is not limited to this. For example, the layout or arrangement of the first and second forward rolls R1 and R2 may vary.

The display panel 100 may be bent by the first forward roll R1 to be inserted into, or retracted from, the housing HS through the first opening OP1 of the housing HS and may be bent by the second forward roll R2 to overlap the second opening OP2 of the housing HS in the first direction DR1.

The display panel 100 displays an image. As already mentioned above, flexibility may be provided to the display panel 100 so that the rolling (or winding) and unrolling (or unwinding) of the display panel 100 may be repeatedly performed with ease. The structure of the display panel 100 will be described later.

The display panel 100 may include areas that are defined by the locations of the elements of the display panel 100 (for example, the first forward roll R1, the second forward roll R2, and the rotary shaft 300) relative to one another. The display panel 100 may include a first portion 110, a second portion 120, the third portion 130, and a wound portion 140.

The display panel 100 may include the first portion 110, which is bent by the first forward roll R1 and forms the main display part MDA of the display device 1 by being inserted into, or retracted from, the housing HS, through the first opening OP1 of the housing HS in case that the display device 1 is in the first state or in the second state. The first portion 110 may be relatively short in case that the display device 1 is in the first state and may be relatively long in case that the display device 1 is in the second state.

The first portion 110 may generally extend in the third direction DR3 due to the first forward roll R1 and may display an image in the first direction DR1. Accordingly, the display surface of the first portion 110 may be on a first side, in the first direction DR1, of the display panel 100. The first portion 110 may also be referred to as a main display region.

As the display panel 100 is bent by the second forward roll R2, the display panel 100 may include the third portion 130, which is visible to the user through the second opening OP2 of the housing HS and forms the touch display part TDA of the display device 1. The third portion 130 may be visible to the user through the second opening OP2 of the housing HS, regardless of whether the display panel 100 is rolled or unrolled, for example, whether the display device 1 is in the first state or in the second state. As the second forward roll R2 engages with the base surface of the second portion 120, the second forward roll R2 may not be visible to the user through the second opening OP2.

The third portion 130 may generally extend in the third direction DR3 due to the second forward roll R2 and may display an image in the first direction DR1. Accordingly, the display surface of the third portion 130 may be on the first side, in the first direction DR1, of the display panel 100. The display surface of the third portion 130 may face the second surface HSb of the housing HS. By way of example, the display surface of the third portion 130 may face the touch sensor unit 200, which is disposed in the second opening OP2 on the second surface HSb of the housing HS. The third portion 130 may also be referred to as a sub-display region.

The third portion 130 may be spaced apart from the first portion 110 by the first and second forward rolls R1 and R2. For example, the third portion 130 may be disposed closer than the first portion 110 to the second surface HSb of the housing HS in the first direction DR1.

The second portion 120 may connect the first and third portions 110 and 130. The second portion 120 may be disposed between the first and second forward rolls R1 and R2 and may generally extend in the second direction DR2. In an embodiment, the display surface of the second portion 120 may face the first surface HSa of the housing HS in the third direction DR3, but the disclosure is not limited thereto. In an embodiment, the display surface of the second portion 120 may not be visible from the outside due to the first surface HSa of the housing HS, but the disclosure is not limited thereto. The second portion 120 may also be referred to as a first sub-area.

The wound portion 140 may be formed by winding part of the display panel 100 the outside of the rotary shaft 300 with the display device 1 being in the first state. The degree to which the wound portion 140 is wound on the outside of the rotary shaft may be determined by how much the display panel 100 is rolled. For example, in case that the display device 1 is in the first state, the display panel 100 may be wound around the rotary shaft 300 to its maximum, and thus, the degree to which the wound portion 140 is wound on the outside of the rotary shaft 300 may reach its maximum. For example, in case that the display device is in the second state, the display panel 100 may not be wound around the rotary shaft 300, and thus, the degree to which the wound portion 140 is wound on the outside of the rotary shaft 300 may reach its minimum. Accordingly, in case that the display device 1 is in the second state, the wound portion 140 may not be formed.

The area of the wound portion 140 as measured in case that the wound portion 140 is unwound, may be inversely proportional to the area of the first portion 110. For example, as the rotary shaft 300 rotates to wind the display panel 100, the wound portion 140 may be formed, and as the area of the wound portion 140 increases, the area of the first portion 110 may decrease with the display device 1 being in the first state. For example, as the rotary shaft 300 rotates to unwind the display panel 100, the wound portion 140 may be unwound so that the area of the wound portion 140 may decrease, and the area of the first portion 110 may increase accordingly with the display device 1 being in the second state.

As already mentioned above, the display panel 100 may be bent at least once in the housing HS by the first forward rolls R1 and R2. For example, the display panel 100 may extend in the third direction DR3 from the rotary shaft 300 to form the third portion 130, may be bent by the second forward roll R2 to extend in the first direction DR2 and thus to form the second portion 120, and may be bent again by the first forward roll R1 to extend back in the third direction DR3 and thus to form the first portion 110.

The relative location of the display panel 100 varies in accordance with the behavior of the first forward roll R1, the second forward roll R2, and the rotary shaft 300, the first portion 110, the second portion 120, the third portion 130, and the wound portion 140 of the display panel 100 may not be fixed, but variable and relative depending on the behavior of the first forward roll R1, the second forward roll R2, and the rotary shaft 300. For example, part of the display panel 100 defined as the first portion 110, which is exposed on the outside of the housing HS, in case that the display device 1 is in the second state, as illustrated in FIG. 3, may be defined as the second portion 120 in case that the display device 1 is in the first state, as illustrated in FIG. 4.

As the display panel 100 is bent and is thus stored near and along the edges of the housing HS, part of the display panel 100 can be disposed near the touch sensor unit 200 to improve the display quality of the touch display part TDA of the display device 1 and can secure space in the housing HS in which the driving unit 700 is embedded. Various types of touch display units can be formed using various side surfaces of the housing HS.

The touch sensor unit 200 may detect touch stimulation from the user. The touch sensor unit 200 may separate the inside of the housing HS from the outside by completely sealing the second opening OP2, which is formed in the second surface HSb of the housing HS.

The touch sensor unit 200 may include a rigid material and may thus be able to protect the display panel 100, which is disposed in the housing HS, from external shock. For example, an air gap may be formed between the touch sensor unit 200 and the third portion 130 of the display panel 100 to protect the third portion 130 of the display panel 100 from external shock such as touch stimulation.

The touch sensor unit 200 may include a transparent material for visible light. Accordingly, the touch sensor unit 200 may allow the third portion 130 of the display panel 100, which overlaps the touch sensor unit 200 in the first direction DR1, to be visible to the user. The structure of the touch sensor unit 200 will be described later.

The touch sensor unit 200 may cover the third portion 130 of the display panel 100. In an embodiment, the area of the touch sensor unit 200 may be exactly the same as the area of the third portion 130 of the display panel 100, but the disclosure is not limited thereto. As an example, the area of the touch sensor unit 200 may be larger than the area of the third portion 130 of the display panel 100. As touch sensors are formed not in the entire display panel 100, but only in a particular or selectable area that needs the touch sensors, the fabrication of the display device 1 can be simplified, and the manufacturing cost of the display device 1 can be reduced.

The driving unit 700 may be disposed in the housing HS and may control the display panel 100 and the touch sensor unit 200. The driving unit 700 may be electrically connected to the display panel 100 and the touch sensor unit 200. It will be described later how the driving unit 700 controls the display panel 100 and the touch sensor unit 200.

The term "connect" or "connection", as used herein, not only means that one element is connected or coupled to another element through physical contact, but also means that one element is connected or coupled to another element via yet another element. One integral member may be understood as having parts connected to one another. Also, the connection between two elements may encompass not only a direct connection between the two elements, but also an electrical connection between the two elements.

The elements of the display device 1 will hereinafter be described.

Figure 6:
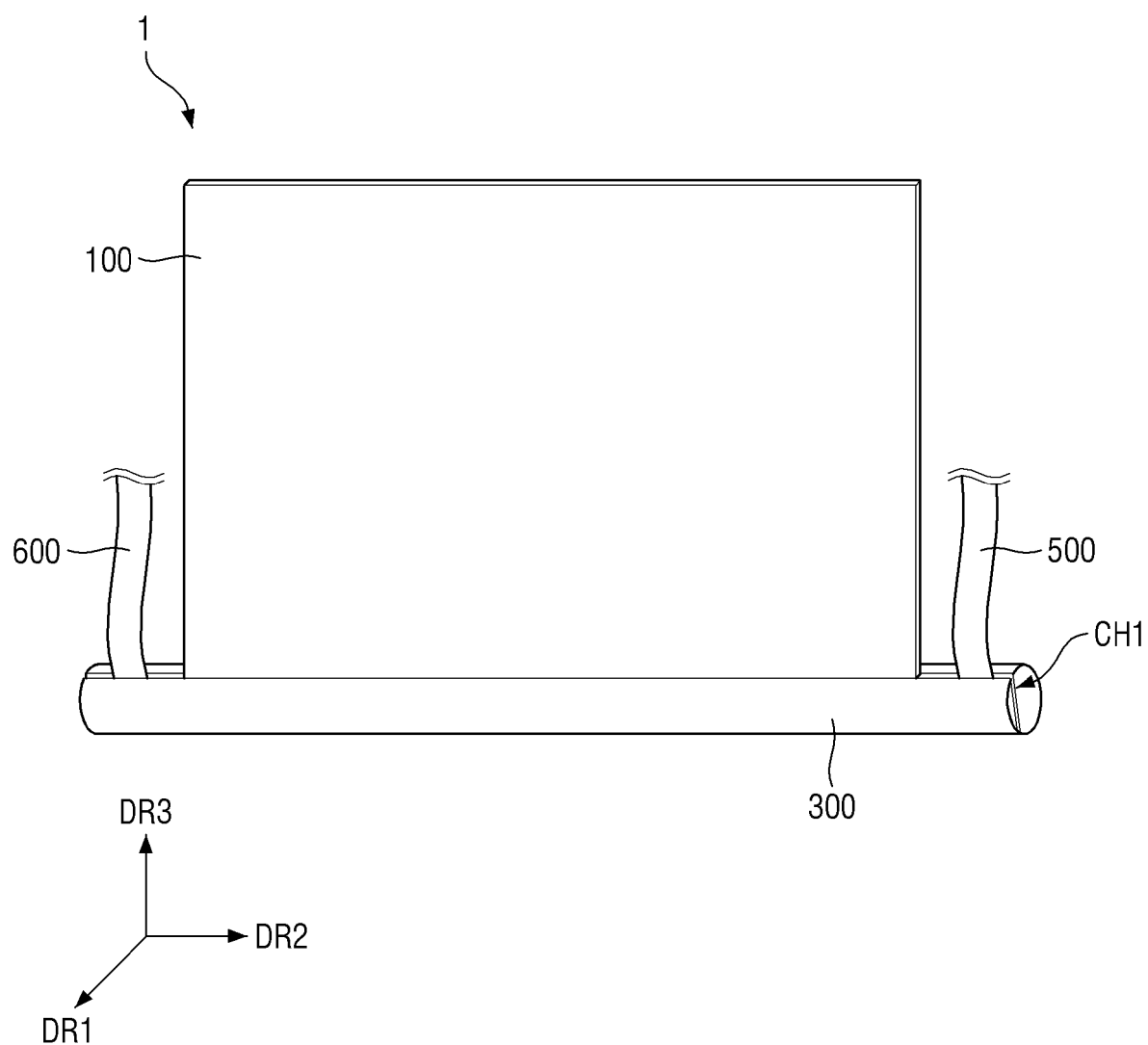
FIG. 6 is a schematic perspective view illustrating the display panel and a rotary shaft of the display device of FIG. 1.
Figure 7:
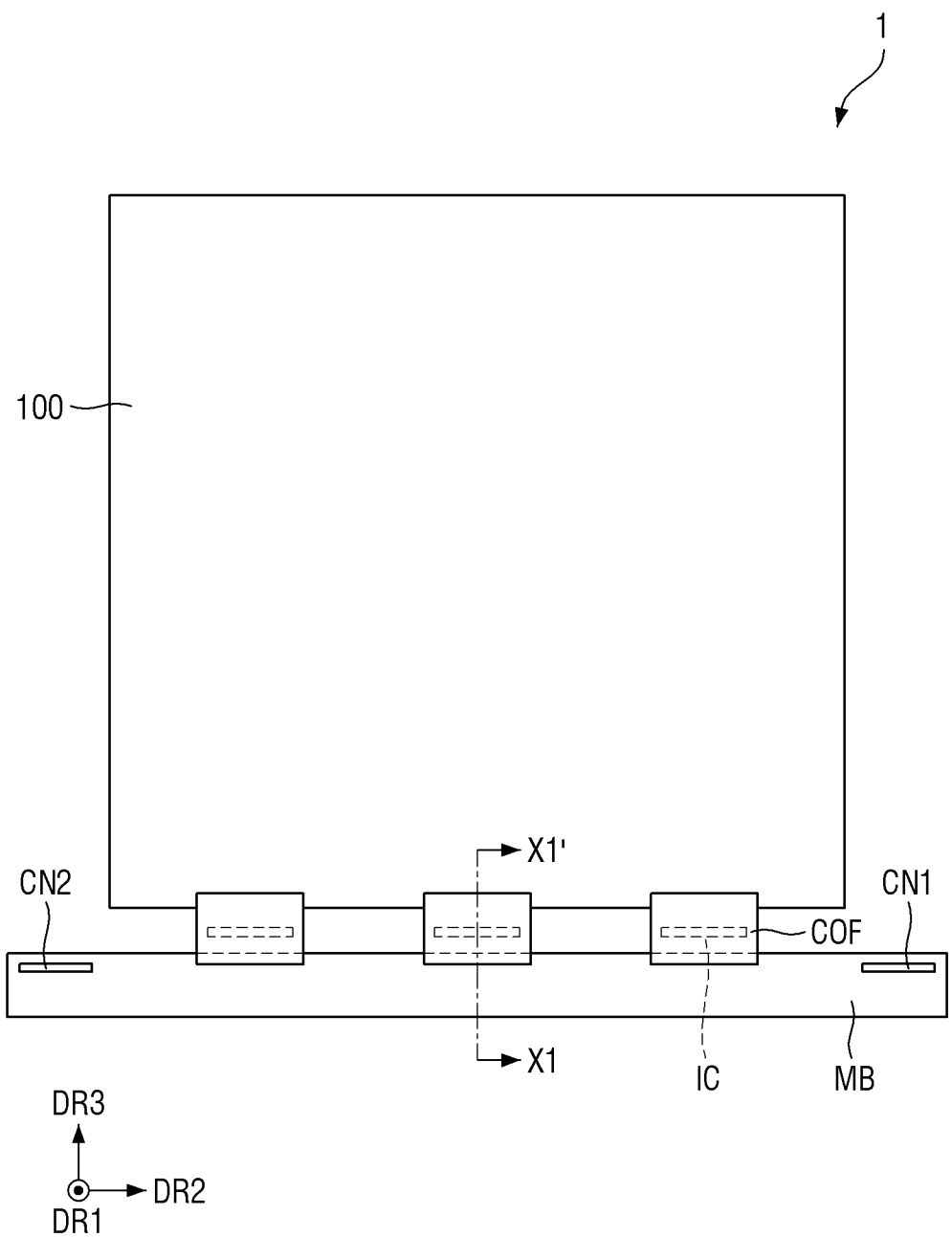
FIG. 7 is a schematic plan view illustrating the display panel of the display device of FIG. 1 and a printed circuit board (PCB) mounted on the display panel.
Figure 8:
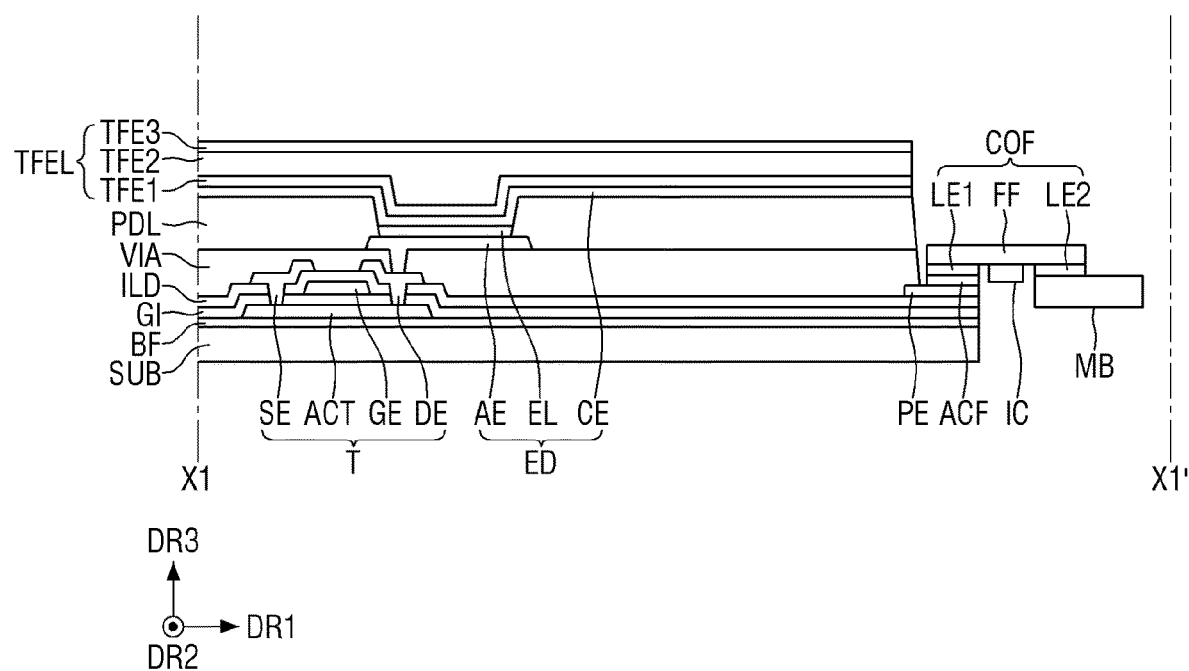
FIG. 8 is a schematic cross-sectional view taken along line X1-X1' of FIG. 7.

FIG. 6 is a schematic perspective view illustrating the display panel and the rotary shaft of the display device of FIG. 1. FIG. 7 is a schematic plan view illustrating the display panel of the display device of FIG. 1 and a printed circuit board (PCB) mounted on the display panel. FIG. 8 is a schematic cross-sectional view taken along line X1-X1' of FIG. 7.

The display panel 100 of the display device 1 and elements or parts connected to the display panel 100 will hereinafter be described with reference to FIGS. 6 through 8.

Referring to FIG. 6, one end or an end of the display panel 100 may engage with a cut groove CH1, which is formed in the rotary shaft 300, and the rotary shaft 300 may protrude from both sides, in the second direction DR2, of the display panel 100.

The rotary shaft 300 may have a cylindrical shape extending in the second direction DR2. The rotary shaft 300 may form a hollow therein to accommodate a PCB "MB" and may include the cut groove CH1, which extends in the second direction DR2.

The cut groove CH1 may penetrate the outer circumferential surface of the rotary shaft 300 and may connect the outside of the rotary shaft 300 and the hollow inside the rotary shaft 300. One end or an end of the display panel 100 may be fixed to the rotary shaft 300 through the cut groove CH1.

A first flexible cable 500, which electrically connects the driving unit 700 and the PCB "MB," may be inserted in the cut groove CH1, in a first protruding portion, which protrudes beyond the display panel 100 toward a first side, in the second direction DR2, of the rotary shaft 300, and a second flexible cable 600, which electrically connects the touch sensor unit 200 and the PCB "MB," may be inserted in the cut groove CH1, in a second protruding portion, which protrudes beyond the display panel 100 toward a second side, in the second direction DR2, of the rotary shaft 300. Accordingly, even if the first and second flexible cables 500 and 600 are rolled or unrolled together with the display panel 100 in response to the rotation of the rotary shaft 300, the first and second flexible cables 500 and 600 may not be able to be twisted or entangled.

Referring to FIGS. 7 and 8, chip-on-films (COFs) "COF" may be attached to the end of the display panel 100, and the PCB "MB" may be attached to the ends of the COFs "COF." The COFs and the PCB "MB" may be received in the rotary shaft 300.

The COFs "COF" may be electrically connected to the display panel 100 and pad electrodes PE. The COFs "COF" may include first base films FF, which include a soft material, first lead electrodes LE1, and second lead electrodes LE2. Driver integrated chips (ICs) "IC" may be mounted on the rear surfaces of the base films FF. The first lead electrodes LE1 may be electrically connected to the pad electrodes PE through anisotropic conductive films (ACFs) "ACF," and the second lead electrodes LE2 may be electrically connected to the PCB "MB."

Referring to FIG. 7, the PCB "MB" may protrude beyond the display panel 100, on both sides, in the second direction DR2, of the display panel 100.

A first connector CN1 may be disposed in a protruding portion of the PCB "MB" on a first side, in the second direction DR2, of the display panel 100. The first connector CN1 may be connected to the first flexible cable 500. An end of the first flexible cable 500 may be connected to the driving unit 700.

A second connector CN2 may be disposed in a protruding portion of the PCB "MB" on a second side, in the second direction DR2, of the display panel 100. The second connector CN2 may be connected to the second flexible cable 600. An end of the second flexible cable 600 may be connected to the touch sensor unit 200.

Referring to FIG. 8, the display panel 100 may include display pixels, which display an image. Each of the display pixels may include a light-emitting element ED and a thin-film transistor (TFT) "T".

A display substrate SUB may be formed of an insulating material such as glass or a polymer resin. For example, the display substrate SUB may include polyimide. The display substrate SUB may be a flexible substrate that is bendable, foldable, or rollable.

A buffer layer BF may be disposed on the display substrate SUB. The buffer layer BF may be a layer for protecting TFTs "T" and light-emitting elements ED from moisture that may penetrate through the display substrate SUB, which is vulnerable to moisture permeation. Although not specifically illustrated, the buffer layer BF may include inorganic layers that may be alternately stacked each other. For example, the buffer layer BF may be formed as a multilayer layer in which at least one inorganic layer selected from among a silicon nitride layer, a silicon oxynitride layer, a silicon oxide layer, a titanium oxide layer, and an aluminum oxide layer may be alternately stacked each other.

Active layers ACT of the TFTs "T" may be disposed on the buffer layer BF. The active layers ACT may include polycrystalline silicon, monocrystalline silicon, low-temperature polycrystalline silicon, amorphous silicon, or an oxide semiconductor. The active layers ACT may include source regions and drain regions, which are obtained by doping a silicon semiconductor or an oxide semiconductor with ions or impurities and thus have conductivity. The active layers ACT may overlap gate electrodes GE of the TFTs "T" in a thickness direction of the display substrate SUB, and the source regions and the drain regions may not overlap the gate electrodes GE in the thickness direction.

A gate insulating layer GI may be disposed on the active layers ACT. The gate insulating layer GI may be formed as an inorganic layer such as, for example, a silicon nitride layer, a silicon oxynitride layer, a silicon oxide layer, a titanium oxide layer, or an aluminum oxide layer.

The gate electrodes GE may be disposed on the gate insulating layer GI. The gate electrodes GE may overlap the active layers ACT in the thickness direction. The gate electrodes GE may be formed as single- or multilayer films including at least one of molybdenum (Mo), aluminum (Al), chromium (Cr), gold (Au), titanium (Ti), nickel (Ni), neodymium (Nd), copper (Cu), and an alloy thereof.

An interlayer insulating layer ILD may be disposed on the gate electrodes GE. The interlayer insulating layer ILD may be formed as an inorganic layer such as, for example, a silicon nitride layer, a silicon oxynitride layer, a silicon oxide layer, a titanium oxide layer, or an aluminum oxide layer.

Source electrodes SE and drain electrodes DE of the TFTs "T" may be disposed on the interlayer insulating layer ILD. The source electrodes SE and the drain electrodes DE may be connected to the source regions and the drain regions of the active layers ACT through contact holes penetrating the interlayer insulating layer 104 and the gate insulating layer GI.

The source electrodes SE and the drain electrodes DE may be formed as single- or multilayer films including at least one of Mo, Al, Cr, Au, Ti, Ni, Nd, Cu, and an alloy thereof.

A via insulating layer VIA may be disposed on the source electrodes SE and the drain electrodes DE. The via insulating layer VIA may be formed as an organic film including an acrylic resin, an epoxy resin, a phenolic resin, a polyamide resin, or a polyimide resin.

The light-emitting elements ED and a pixel-defining layer PDL may be disposed on the via insulating layer VIA. Each of the light-emitting elements ED may include a light-emitting pixel electrode AE, a light-emitting layer EL, and a light-emitting common electrode CE.

Light-emitting pixel electrodes AE may be formed on the via insulating layer VIA. The light-emitting pixel electrodes AE may be connected to the drain electrodes DE through the via insulating layer VIA.

In a top emission structure in which light is emitted in a direction from light-emitting layers EL to the light-emitting common electrode CE, the light-emitting pixel electrodes AE may have a stacked layer structure of indium tin oxide (ITO)/silver (Ag)/ITO, but the disclosure is not limited thereto.

The pixel-defining layer PDL may be formed on the via insulating layer VIA to divide the light-emitting pixel electrodes AE and thus to define emission areas. The pixel-defining layer PDL may be formed to cover the edges of each of the light-emitting pixel electrodes AE. The pixel-defining layer PDL may be formed as an organic film including an acrylic resin, an epoxy resin, a phenolic resin, a polyamide resin, or a polyimide resin.

The emission areas refer to areas in which the light-emitting pixel electrodes AE, the light-emitting layers EL, and the light-emitting common electrode CE are sequentially stacked each other and holes from the light-emitting pixel electrodes AE and electrons from the light-emitting common electrode CE combine together to emit light.

The light-emitting layers EL are formed on the light-emitting pixel electrodes AE. The light-emitting layers EL may include an organic material and may thus be able to emit light of a particular or given color. For example, the light-emitting layers EL may include hole transport layers, organic material layers, and electron transport layers. The light-emitting layers EL may emit at least one color light.

The light-emitting common electrode CE is formed on the light-emitting layers EL. The light-emitting common electrode CE may be formed to cover the light-emitting layers EL. The light-emitting common electrode CE may be a common layer formed in common in all the emission areas. A capping layer may be formed on the light-emitting common electrode CE.

In the top emission structure, the light-emitting common electrode CE may be formed of a transparent conductive oxide (TCO) such as ITO or indium zinc oxide (IZO) capable of transmitting light therethrough or a semitransparent conductive metal such as magnesium (Mg), Ag, or an alloy thereof.

An encapsulation layer TFEL may be disposed on the light-emitting common electrode CE. The encapsulation layer TFEL may include at least one inorganic layer to prevent the permeation of oxygen or moisture into the light-emitting layers EL. Also, the encapsulation layer TFEL may include at least one organic layer for protecting the light-emitting elements ED from a foreign material such as dust. For example, the encapsulation layer TFEL may include a first encapsulation inorganic layer TFE1, an encapsulation organic layer TFE2, and a second encapsulation inorganic layer TFE3.

The pad electrodes PE may be disposed in a same layer as the source electrodes SE and the drain electrodes DE. The pad electrodes PE may include at least one of the aforementioned materials for forming the source electrodes SE and the drain electrodes DE. The pad electrodes PE may be electrically connected to the COFs "COF" through the ACFs "ACF."

Figure 9:
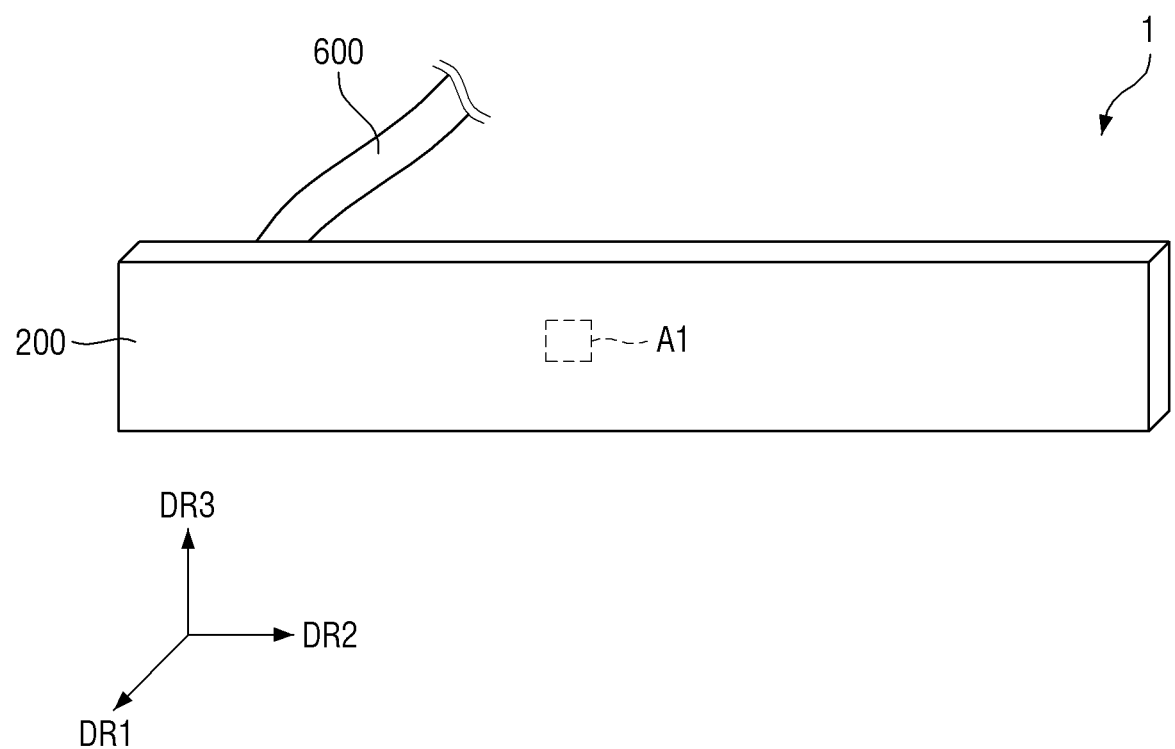
FIG. 9 is a schematic perspective view illustrating a touch sensor unit of the display device of FIG. 1.
Figure 10:
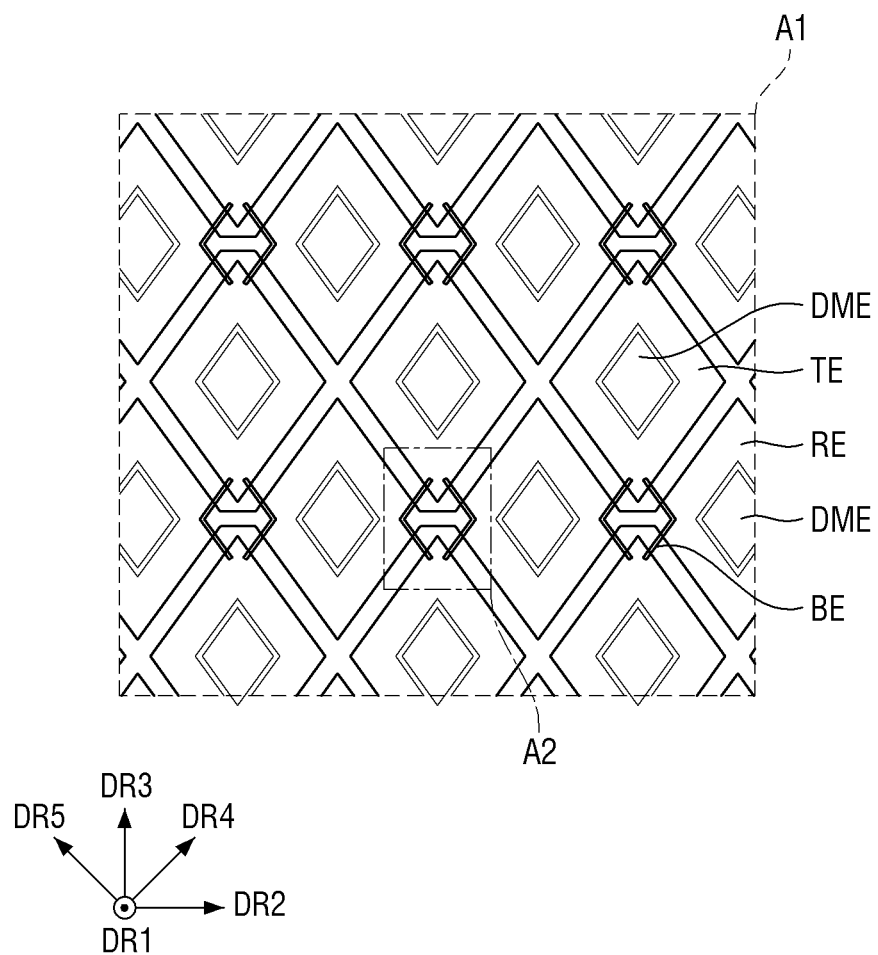
FIG. 10 is an enlarged schematic perspective view illustrating an area A1 of FIG. 9.
Figure 11:
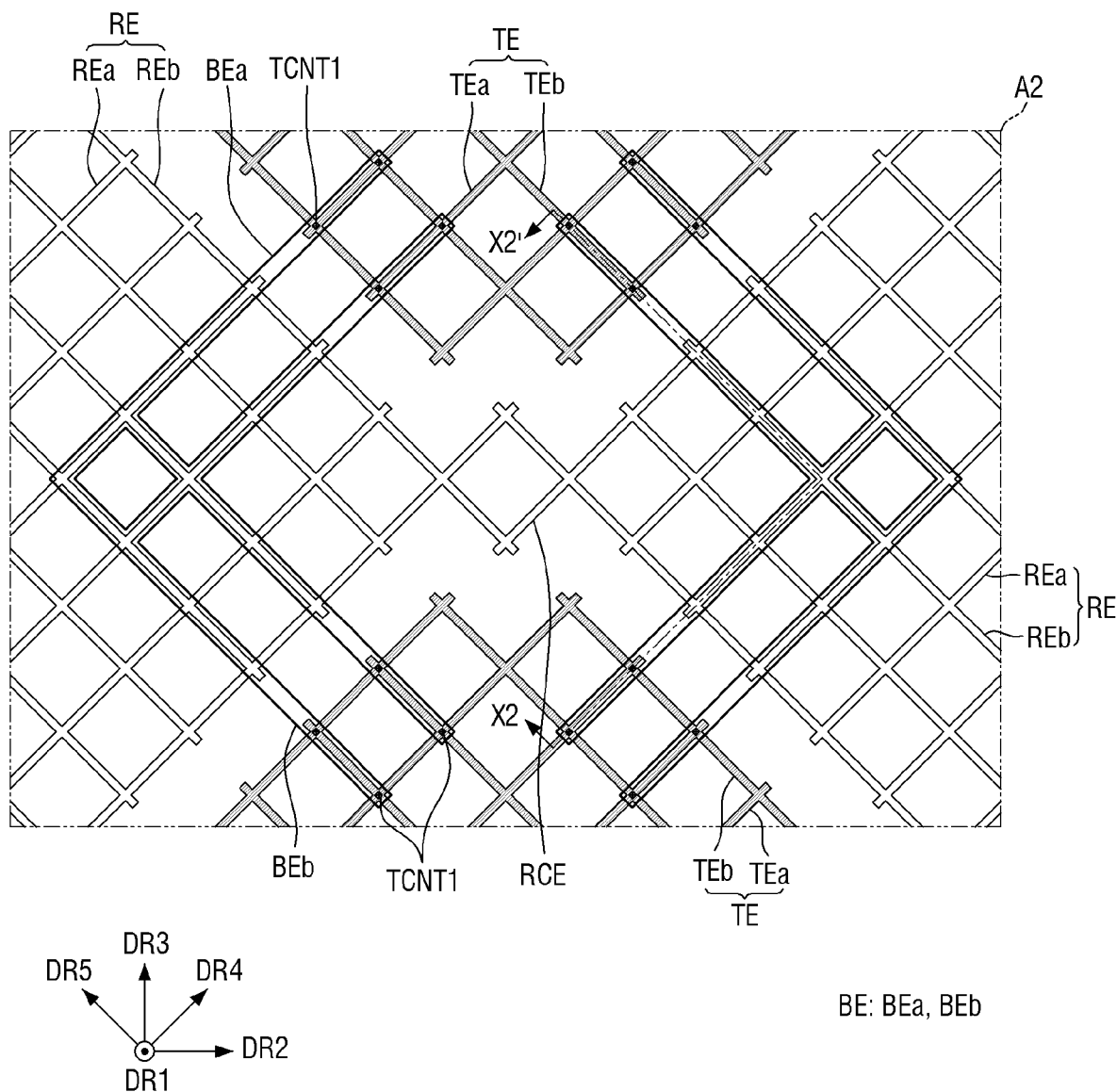
FIG. 11 is an enlarged schematic perspective view illustrating an area A2 of FIG. 10.
Figure 12:
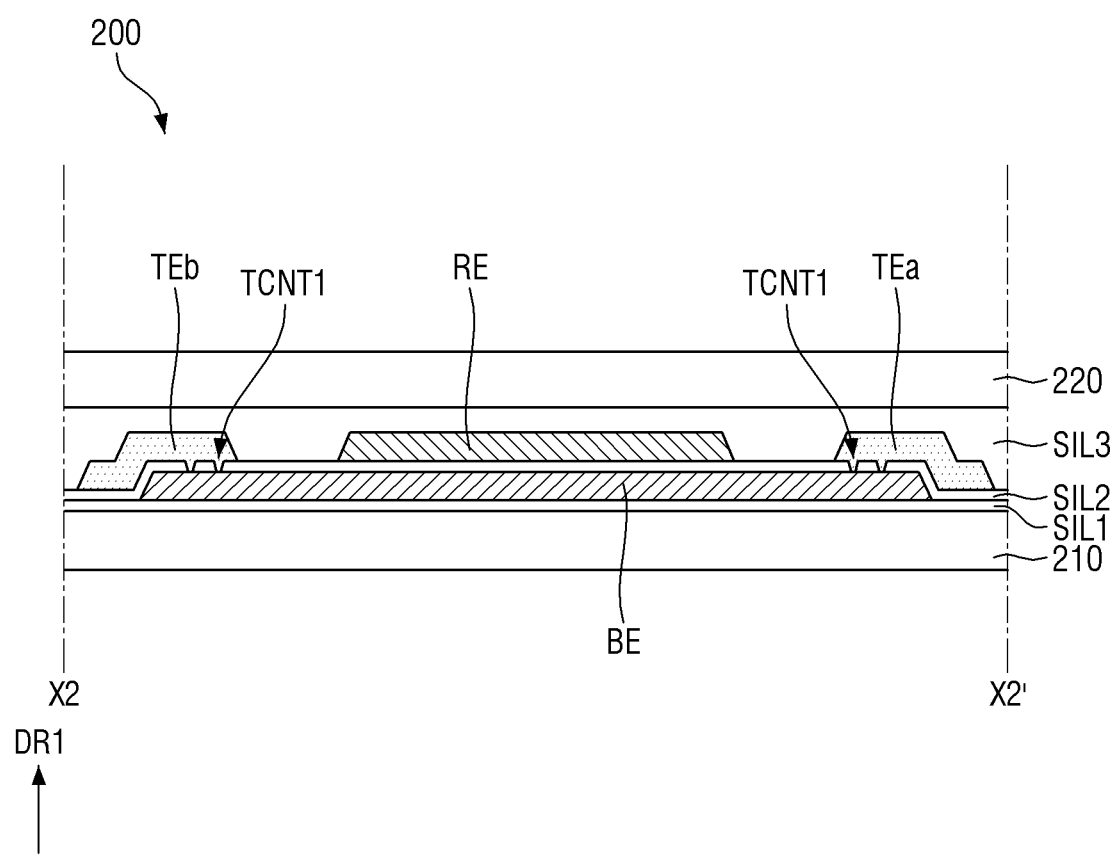
FIG. 12 is a schematic cross-sectional view taken along line X2-X2' of FIG. 11.

FIG. 9 is a schematic perspective view illustrating the touch sensor unit of the display device of FIG. 1. FIG. 10 is an enlarged schematic perspective view illustrating an area A1 of FIG. 9. FIG. 11 is an enlarged schematic perspective view illustrating an area A2 of FIG. 10. FIG. 12 is a schematic cross-sectional view taken along line X2-X2' of FIG. 11.

The structure of the touch sensor unit 200 of the display device 1 will hereinafter be described with reference to FIGS. 9 through 12.

Referring to FIG. 9, the second flexible cable 600, which is connected to the PCB "MB," may be disposed on a second surface, in the first direction DR1, of the touch sensor unit 200. In an embodiment, the touch sensor unit 200 may have a 3D shape similar to a rectangular parallelepiped shape, but the disclosure is not limited thereto.

Referring to FIGS. 10 and 11, the touch sensor unit 200 may include driving electrodes TE, sensing electrodes RE, and dummy electrodes DME. The driving electrodes TE and the sensing electrodes RE, as touch electrodes, may form mutual capacitance or magnetic capacitance to detect touch stimulation from an object or a person.

Fourth and fifth directions DR4 and DR5 are as defined in FIGS. 10 and 11. Referring to FIGS. 10 and 11, the fourth direction DR4 may be a direction between first sides in the second and third directions DR2 and DR3, and the fifth direction DR5 may be a direction between a second side in the second direction DR2 and the first side in the third direction DR3.

The driving electrodes TE may be arranged or disposed in the second and third directions DR2 and DR3. The driving electrodes TE may be spaced apart from one another in the second and third directions DR2 and DR3. Pairs of adjacent driving electrodes TE in the third direction DR3 may be electrically connected through bridge electrodes BE.

The driving electrodes TE may be connected to a first touch pad unit (not illustrated) through driving lines (not illustrated). The first touch pad unit may be connected to the PCB "MB" through the second flexible cable 600. The first touch pad unit may provide touch driving signals to the driving electrodes TE through the driving lines.

The bridge electrodes BE may be bent at least once. For example, the bridge electrodes BE may be in the shape of angle brackets (for example, "<" and ">"), but the shape of the bridge electrodes BE is not particularly limited. Each pair of adjacent driving electrodes TE in the second direction DR2 may be connected by multiple bridge electrodes BE, and thus, even if one of the bridge electrodes BE is disconnected, the driving electrodes TE can be stably connected via the other non-disconnected bridge electrodes BE. Each pair of adjacent driving electrodes TE may be connected by two bridge electrodes BE, but the number of bridge electrodes BE used to connect each pair of adjacent driving electrodes TE is not particularly limited.

The bridge electrodes BE may be disposed in a different layer from the driving electrodes TE and the sensing electrodes RE. Pairs of adjacent sensing electrodes RE in the second direction DR2 may be electrically connected through connectors RCE, which are disposed in a same layer as the driving electrodes TE or the sensing electrodes RE, and the pairs of adjacent driving electrodes TE in the third direction DR3 may be electrically connected through bridge electrodes BE disposed in a different layer from the driving electrodes TE or the sensing electrodes RE. Thus, even if the bridge electrodes BE overlap the sensing electrodes RE in the first direction DR1, the driving electrodes TE can be insulated from the sensing electrodes RE. Mutual capacitances may be formed between the driving electrodes TE and the sensing electrodes RE.

The sensing electrodes RE may extend in the second direction DR2 and may be spaced apart from one another in the third direction DR3. The sensing electrodes RE may be arranged or disposed in the second and third directions DR2 and DR3, and the pairs of adjacent sensing electrodes RE in the second direction DR2 may be electrically connected by the connectors RCE.

The sensing electrodes RE may be connected to a second touch pad unit (not illustrated) through sensing lines (not illustrated). For example, the second touch pad unit may be connected to the PCB "MB" through the second flexible cable 600. A touch driving unit (not illustrated) may be disposed on the PCB "MB." The touch driving unit may receive touch sensing signals through sensing lines, which are connected to the second touch pad unit, and may detect variations in mutual capacitance between the driving electrodes TE and the sensing electrodes RE.

Each of the dummy electrodes DME may be surrounded by the driving electrodes TE or the sensing electrodes RE. Each of the dummy electrodes DME may be spaced apart from, and insulated by, the driving electrodes TE or the sensing electrodes RE. Thus, the dummy electrodes DME may be electrically floated.

Referring to FIG. 11, the driving electrodes TE, the sensing electrodes RE, and the dummy electrodes DME may form a mesh structure or a fishnet structure in a plan view.

The driving electrodes TE may be arranged or disposed in the second and third directions DR2 and DR3. The driving electrodes TE may be spaced apart from one another in the second and third directions DR2 and DR3. The pairs of adjacent driving electrodes TE in the third direction DR3 may be electrically connected through the bridge electrodes BE.

Each of the driving electrodes may include a first portion TEa and a second portion TEb, which extend in the fourth and fifth directions DR4 and DR5, respectively.

The bridge electrodes BE may be disposed in a different layer from the driving electrodes TE and the sensing electrodes RE. Each of the bridge electrodes BE may include a first portion BEa and a second portion BEb. For example, a first portion BEa of one bridge electrode BE may be connected to a driving electrode TE on one side or a side of the bridge electrode BE through a first touch contact hole TCNT1, extending in the third direction DR3, and a second portion BEb of the bridge electrode BE may be bent from the first portion BEa, in the area overlapping a sensing electrode RE, to extend in the second direction DR2, and may be connected to a driving electrode TE on the other side of the bridge electrode BE through another first touch contact hole TCNT1. Accordingly, each of the bridge electrodes BE can electrically connect a pair of adjacent driving electrodes TE in the second direction DR2.

The sensing electrodes RE may extend in the second direction DR2 and may be spaced apart from one another in the third direction DR3. The sensing electrodes RE may be arranged or disposed in the second and third directions DR2 and DR3, and the pairs of adjacent sensing electrodes RE in the second direction DR2 may be electrically connected through the connectors RCE. For example, the connectors RCE of the sensing electrodes RE may be disposed within the minimum distance between pairs of adjacent driving electrodes TE.

Each of the sensing electrodes RE may include first and second portions REa and REb, which extend in the fourth and fifth directions DR4 and DR5, respectively.

Referring to FIGS. 11 and 12, the touch sensor unit 200 may include a first touch substrate 210, a first insulating layer SILL the bridge electrodes BE, a second insulating layer SIL2, the driving electrodes TE, the sensing electrodes RE, a third insulating layer SIL3, and a second touch substrate 220.

The first touch substrate 210 may include a rigid material. For example, the first touch substrate 210 may include glass or quartz. An air gap may be formed between the first display substrate 210 and the third portion 130 of the display panel 100, as illustrated in FIGS. 3 and 4, and may thus protect the third portion 130 of the display panel 100 from external shock such as touch stimulation.

The first touch insulating layer SIL1 may be disposed on the first touch substrate 210. The first touch insulating layer SIL1 may have insulation and optical functions. The first touch insulating layer SIL1 may include at least one inorganic film. The first touch insulating layer SIL1 may be optional.

The second touch insulating layer SIL2 may cover the first touch insulating layer SILL The bridge electrodes BE may be further disposed on the first touch insulating layer SIL1 as touch electrodes, and the second touch insulating layer SIL2 may cover the bridge electrodes BE.

The second touch insulating layer SIL2 may have insulation and optical functions. For example, the second touch insulating layer SIL2 may include at least one inorganic film selected from among a silicon nitride layer, a silicon oxynitride layer, a silicon oxide layer, a titanium oxide layer, and an aluminum oxide layer.

The other touch electrodes, for example, the driving electrodes TE and the sensing electrodes RE, may be disposed on the second touch insulating layer SIL2. The driving electrodes TE and the sensing electrodes RE may be formed as single-layer films including Mo, Ti, Cu, Al, ITO, or a silver (Ag)-palladium (Pd)-copper (Cu) (APC) alloy or as stacked laminated structures of Al and Ti (for example, Ti/Al/Ti), Al and ITO (for example, ITO/Al/ITO), or an APC alloy and ITO (for example, ITO/APC/ITO).

The third touch insulating layer SIL3 may cover the driving electrodes TE, the sensing electrodes RE, and the second touch insulating layer SIL2. The third touch insulating layer SIL3 may have insulation and optical functions. The third touch insulating layer SIL3 may be formed of one of the aforementioned materials for forming the second touch insulating layer SIL2, but the disclosure is not limited thereto.

Figure 13:
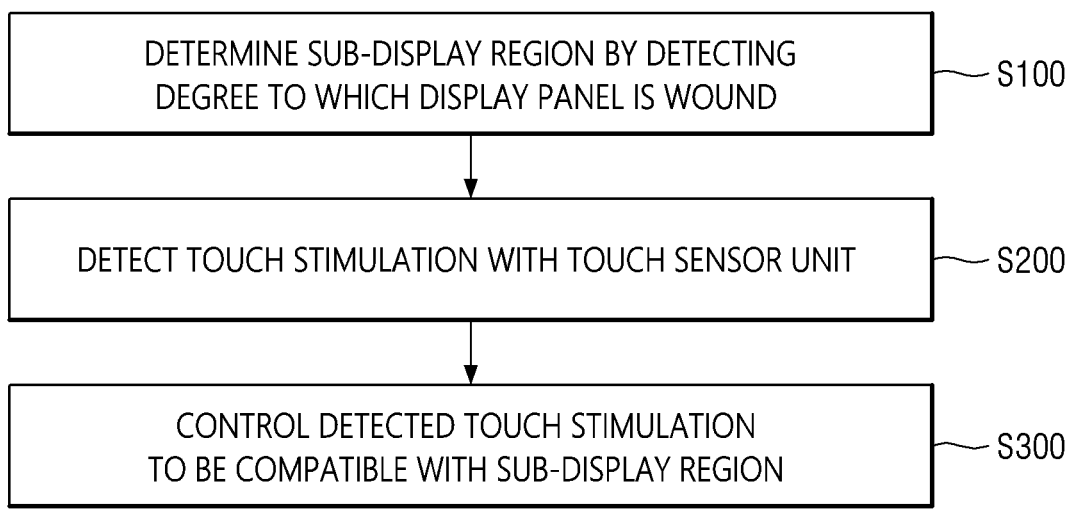
FIG. 13 is a flowchart illustrating a method of controlling the touch sensor unit and the display panel of the display device of FIG. 1.

FIG. 13 is a flowchart illustrating a method of controlling the touch sensor unit and the display panel of the display device of FIG. 1.

Referring to FIG. 13 and further to FIGS. 1 through 4, the method may include: determining the sub-display region of the display panel 100 by detecting the degree to which the display panel 100 is wound (S100); detecting touch stimulation with the touch sensor unit 200 (S200); and controlling the detected touch stimulation to be compatible with the sub-display region (for example, the third portion 130 of the display panel 100) (S300).

The driving unit 700 determines the sub-display region of the display panel 100 by determining the degree to which the display panel 100 is wound (S100).

The driving unit 700 may determine the degree to which the display panel 100 is wound by determining the degree to which the PCB "MB" of FIG. 6 is wound around the rotary shaft 300 or the number of rotations of the PCB "MB." As the length of the second portion 120 of the display panel 100 is uniform regardless of the degree to which the display panel 100 is wound, the third portion 130 of the display panel 100 may be defined in consideration of the degree to which the display panel 100 is wound and the length of the second portion 120 of the display panel 100.

The third portion 130 may be allowed by the driving unit 700 to display an image as the sub-display region. As already mentioned above, as the third portion 130 overlaps the touch sensor unit 200 of the housing HS and is visible to the user through the second opening OP2 and the touch sensor unit 200, an image displayed by the third portion 130 may also be visible to the user.

Thereafter, touch stimulation from the user is detected with the touch sensor unit 200 (S200). The touch sensor unit 200 may detect touch stimulation from the user by forming mutual capacitance or magnetic capacitance with the structure described above with reference to FIGS. 9 through 12.

Thereafter, the driving unit 700 may control the touch stimulation detected by the touch sensor unit 200 to be compatible with the sub-display region, for example, the third portion 130 of the display panel 100. For example, the third portion 130 may display various function buttons in the touch display part TDA of the display device 1, and in response to the user touching part of the touch sensor unit 200 corresponding to one of the function buttons, the driving unit 700 may determine the touch stimulation and may provide a function corresponding to the touched function button.

Display devices according to other embodiments will hereinafter be described, focusing on the differences with the display device 1. Like reference numerals indicate like elements throughout the disclosure, and thus, detailed descriptions thereof may be omitted.

Figure 14:
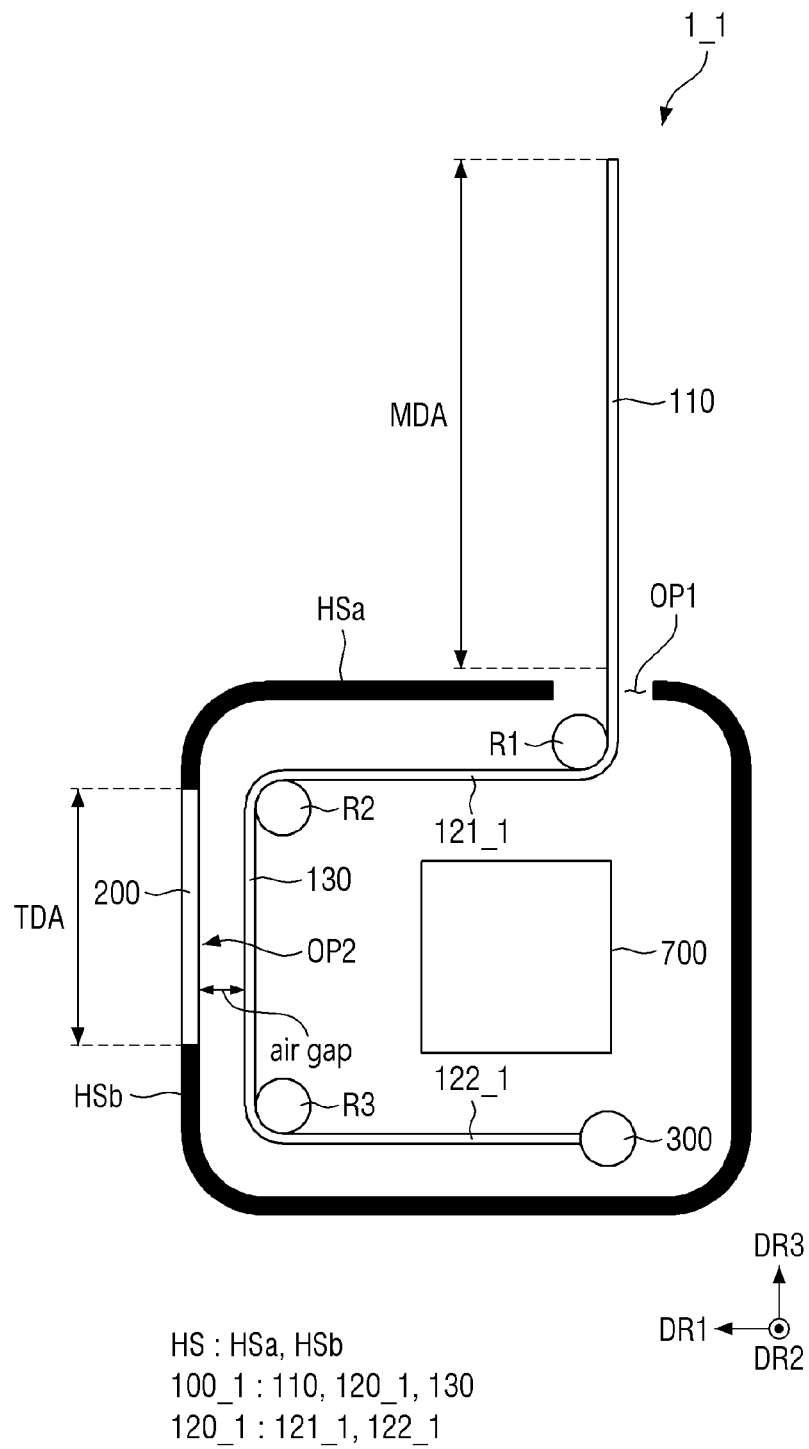
FIG. 14 is a schematic cross-sectional view illustrating the internal structure of a housing of a display device according to an embodiment.
Figure 15:
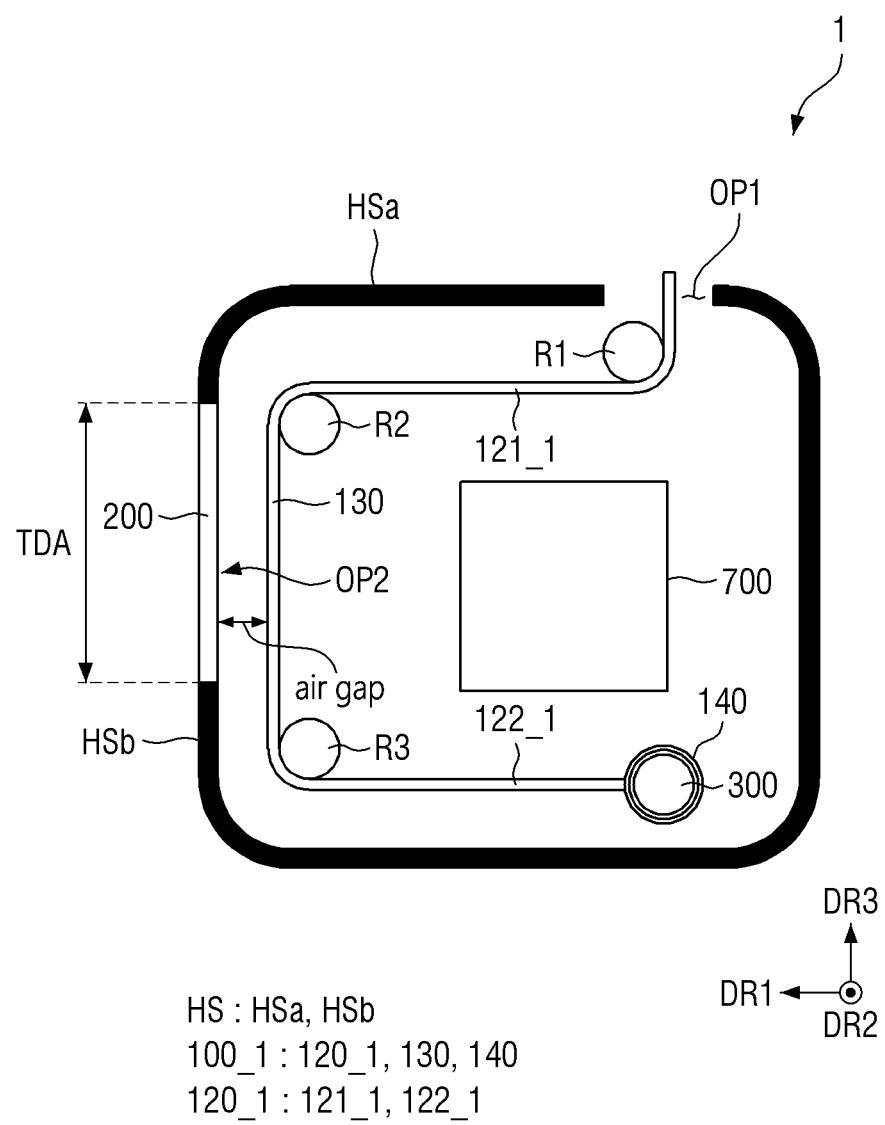
FIG. 15 is a schematic cross-sectional view illustrating the display device of FIG. 14 with a display panel wound.

FIG. 14 is a schematic cross-sectional view illustrating the internal structure of a housing of a display device according to an embodiment. FIG. 15 is a schematic cross-sectional view illustrating the display device of FIG. 14 with a display panel wound.

Referring to a display device 1_1 of FIGS. 14 and 15, a display panel 100_1 may be bent in a C shape (or a square C shape) but the disclosure is not limited thereto and may be stored in a housing HS. It is also to be understood that the shapes disclosed herein also include shapes substantial to the shapes disclosed herein.

The display device 1_1 may further include a third forward roll R3, which is spaced apart from a second forward roll R2 in a third direction DR3, and a rotary shaft 300 may be spaced apart from the third forward roll R3 in a first direction DR1.

The third forward roll R3 may bend a portion of the display panel 100_1, extending in the third direction DR3, to be bent toward a second side, in the first direction DR1, of the housing HS. The third forward roll R3 may be disposed at the base surface of the display panel 100 and may thus not be able to be visible to the outside. The second and third forward rolls R2 and R3 may be aligned with each other in the third direction DR3. For example, the centers of the second and third forward rolls R2 and R3 may not fall on a straight line parallel to the third direction DR3.

The rotary shaft 300 may be disposed on a second side, in the first direction DR1, of the third forward roll R3 and may be spaced apart from a first forward roll R1 in the third direction DR3. The rotary shaft 300 may not be visible to the outside due to a second surface HSb of the housing HS.

The display panel 100_1 may include first and third portions 110 and 130, which display an image, and a second portion 120_1, which does not display an image. The second portion 120_1 may include first and second sub-regions 121_1 and 122_1.

For example, the display panel 100_1 may include the first portion 110, which is inserted into, or retracted from the housing HS, through a first opening OP1, the first sub-region 121_1, which is disposed on the first and second forward rolls R1 and R2, the third portion 130, which is disposed on the second and third forward rolls R2 and R3, and the second sub-region 122_1, which extends from the third forward roll R3 to the rotary shaft 300.

The first portion 110, the first sub-region 121_1, and the third portion 130 may be substantially the same as the first portion 110, the second portion 120, and the third portion 130, respectively, of the display device 1, and thus, detailed descriptions thereof may be omitted.

The display panel 100_1 may be bent by the third forward roll R3 to form the second sub-region 122_1. The second sub-region 122_1 may generally extend in the first direction DR1. The display surface of the second sub-region 122_1 may face a third surface of the housing HS that is opposite to a first surface HSa of the housing HS in the third direction DR3.

An end of the second sub-region 122_1 may be fixed to the rotary shaft 300. In case that the display device 1_1 is in a first state, the end of the second sub-region 122_1 may be wound on the outside of the rotary shaft 300 and may thus form a wound portion 140. The wound portion 140 is substantially the same as the wound portion 140 the display device 1, and thus, a detailed description thereof may be omitted.

As an end of the third portion 130 on a second side, in the third direction DR3, of the display panel 100_1 engages with the third forward roll R3 where the wound portion 140 is not formed, the third portion 130, which is exposed through a second opening OP2, may be able to maintain a uniform surface quality due to the second and third forward rolls R2 and R3. As a result, the display quality of a touch display part TDA of the display device 1_1 can be improved.

Figure 16:
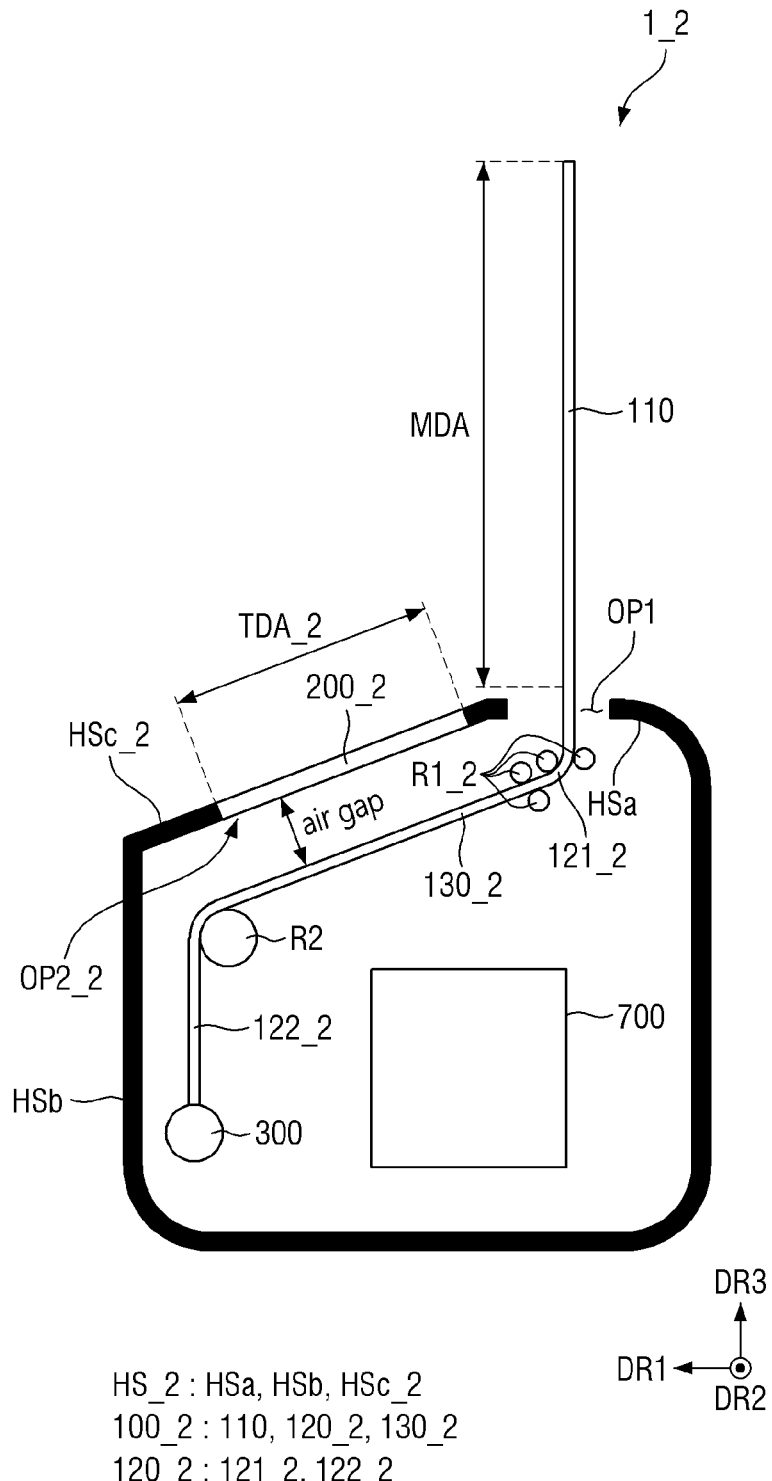
FIG. 16 is a schematic cross-sectional view illustrating the internal structure of a housing of a display device according to an embodiment.

FIG. 16 is a schematic cross-sectional view illustrating the internal structure of a housing of a display device according to an embodiment.

Referring to a display device 1_2 of FIG. 16, a touch display part TDA_2 may be formed diagonally.

A housing HS_2 may further have an inclined surface HSc_2, which is disposed between first and second surfaces HSa and HSb and extends diagonally. As a second opening OP2_2 is formed not in the second surface HSb, but in the inclined surface HSc_2, the touch display part TDA_2 may be formed diagonally. Accordingly, a touch sensor unit 200_2 may also be formed diagonally in a schematic cross-sectional view.

First forward rolls R1_2 may be disposed. The first forward rolls R1_2 may allow a display panel 100_2 to extend diagonally in a state of being bent.

The display panel 100_2 may include first and third portions 110 and 130_2, which display an image, and a second portion 120_2, which does not display an image. The second portion 120_2 may include first and second sub-regions 121_2 and 122_2. The first portion 110 of the display panel 100_2 is the same as its counterpart of any one of the previous embodiments, and thus, a detailed description thereof may be omitted.

Part of the display panel 100_2 between the first forward rolls R1_2 may be the first sub-region 121_2.

The display panel 100_2 may be bent by the first forward rolls R1_2 and may thus include the third portion 130_2, which is visible to a user through the second opening OP2_2 of the housing HS_2 and forms a touch display part TDA_2 of the display device 1_2. The third portion 130_2 may extend diagonally.

The display panel 100_2 may be bent by a second forward roll R2 and may thus include the second sub-region 122_2, which engages with a rotary shaft 300. As already mentioned above, as the second opening OP2_2 is not formed in the second surface HSb of the housing HS_2, the second sub-region 122_2 may not be visible to the outside due to the second surface HSb.

Figure 17:
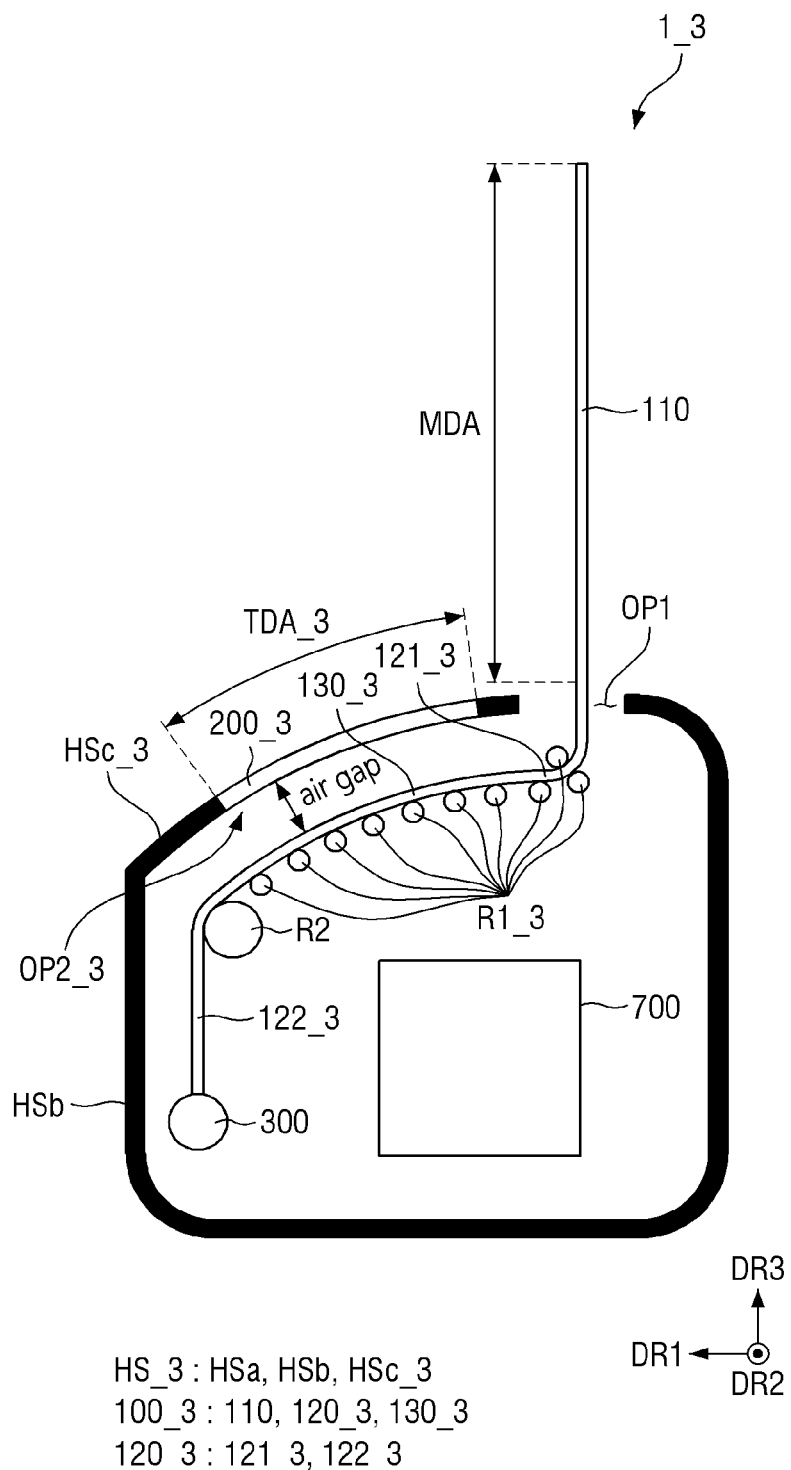
FIG. 17 is a schematic cross-sectional view illustrating the internal structure of a housing of a display device according to an embodiment.

FIG. 17 is a schematic cross-sectional view illustrating the internal structure of a housing of a display device according to an embodiment.

Referring to a display device 1_3 of FIG. 17, a touch display part TDA_3 may be formed to be curved.

A housing HS_3 may further have an inclined surface HSc_3, which is disposed between first and second surfaces HSa and HSb and extends in a curved manner. A second opening OP2_3 may be formed not in the second surface HSb, but in the inclined surface HSc_3, and the touch display part TDA_3 may be formed to be convexly curved in a third direction DR3. Accordingly, a touch sensor unit 200_3 may also be formed to be convexly curved in the third direction DR3, in a schematic cross-sectional view.

First forward rolls R1_3 may be disposed. The first forward rolls R1_3 may bend a display panel 100_3 to extend in a curved manner. For example, the first forward rolls R1_3 may be disposed on the base surface of a third portion 130_3 of a display panel 100_3 and may thus bend the display panel 100_3 to extend in a curved manner.

The display panel 100_3 may include first and third portions 110 and 130_3, which display an image, and a second portion 120_3, which does not display an image. The second portion 120_3 may include first and second sub-regions 121_3 and 122_3. The first portion 110 of the display panel 100_3 is the same as its counterpart of any one of the previous embodiments, and thus, a detailed description thereof may be omitted.

Part of the display panel 100_3 between the first forward rolls R1_3 may be the first sub-region 121_3.

The display panel 100_3 may be bent by the first forward rolls R1_3 and may thus include the third portion 130_3, which is visible to a user through the second opening OP2_3 of the housing HS_3 and forms a touch display part TDA_3 of the display device 1_3. The third portion 130_3 may extend in a convexly curved manner toward a first side, in the third direction DR3, of the housing HS_3.

The display panel 100_3 may be bent by a second forward roll R2 and may thus include the second sub-region 122_3, which engages with a rotary shaft 300. As already mentioned above, as the second opening OP2_3 is not formed in the second surface HSb of the housing HS_3, the second sub-region 122_3 may not be visible to the outside due to the second surface HSb.

Figure 18:
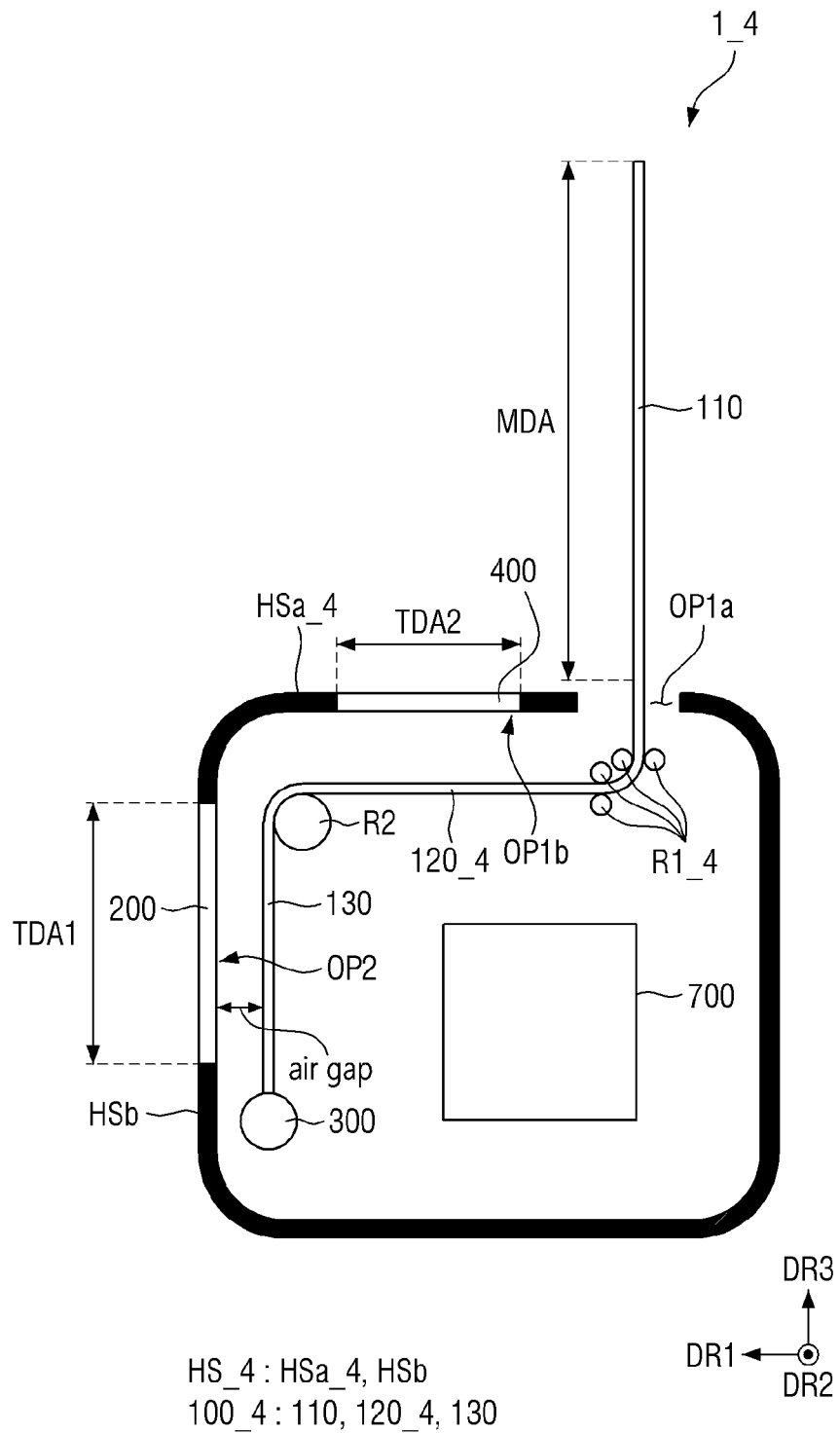
FIG. 18 is a schematic cross-sectional view illustrating the internal structure of a housing of a display device according to an embodiment.

FIG. 18 is a schematic cross-sectional view illustrating the internal structure of a housing of a display device according to an embodiment.

Referring to a display device 1_4 of FIG. 18, touch display parts, for example, first and second touch display parts TDA1 and TDA2, may be formed. For example, the first touch display part TDA1 may be formed at a first side, in a first direction DR1, of a housing HS_4, and the second touch display part TDA2 may be formed at a first side, in a third direction DR3, of the housing HS_4.

A (1_1)-th opening OP1*a*, through which a display panel 100_4 is inserted into, or retracted from, the housing HS_4, and a (1_2)-th opening OP1*b*, which forms the second touch display part TDA2, may be formed on a first surface HSa_4 of the housing HS_4. The (1_1)-th opening OP1*a* is substantially the same as the first opening OP1 of the display device 1, and thus, a detailed description thereof may be omitted.

A second touch sensor unit 400 may be disposed in the (1_2)-th opening OP1*b* of the housing HS_4. The second touch sensor unit 400 may detect touch stimulation from a user. The second touch sensor unit 400 may completely seal the (1_2)-th opening OP1*b* and may thus protect various elements and parts disposed in the housing HS_4 from the outside. The structure of the second touch sensor unit 400 is substantially the same as the touch sensor unit 200 of the display device 1, and thus, a detailed description thereof may be omitted.

A second surface HSb of the housing HS_4, a second opening OP2, which is formed in the second surface HSb of the housing HS_4, and a touch sensor unit 200, which is disposed in the second opening OP2, are substantially the same as their respective counterparts of the display device 1, and thus, detailed descriptions thereof may be omitted.

First forward rolls R1_4 may be provided. As the first forward rolls R1_4 have a smaller diameter than in case that disposed in a housing where there is only one first forward roll, a display panel 100_4 may be disposed closer to the first surface HSa_4 of the housing HS_4.

The display panel 100_4 may include first, second, and third portions 110, 120_4, and 130. The first and third portions 110 and 130 are the same as their respective counterparts of the display device 1, and thus, detailed descriptions thereof may be omitted.

The second portion 120_4 may connect the first and third portions 110 and 130. The second portion 120_4 may be disposed between the first forward rolls R1_4 and a second forward roll R2 and may generally extend in a second direction DR2.

The display surface of the second portion 120_4 may face the first surface HSa_4 of the housing HS_4 in the third direction DR3. Accordingly, the display surface of the second portion 120_4, which is on a first side, in the third direction DR3, of the housing HS_4, may overlap the (1_2)-th opening OP1*b*, which is formed on the first surface HSa_4 of the housing HS_4, in the third direction DR3 and may thus be visible to the outside.

In concluding the detailed description, those skilled in the art will appreciate that many variations and modifications can be made to the embodiments without substantially departing from the principles of the disclosure. Therefore, the disclosed embodiments are used in a generic and descriptive sense only and not for purposes of limitation.

What is claimed is:

1. A display device comprising:
   a housing including a first surface including a first opening, and a second surface including a second opening;
   a rotary shaft disposed in the housing;
   a display panel wound on an outside of the rotary shaft and inserted into, or retracted from, the housing through the first opening;
   a touch sensor disposed in the second opening and spaced apart from the display panel; and
   a driver disposed in the housing and electrically connected to the display panel and the touch sensor, wherein
   the touch sensor is transparent with respect to visible light,
   the display panel includes;
      a main display region that displays an image through the first opening; and
      a sub-display region that overlaps the touch sensor in a plan view and displays an image, and
   the driver controls touch stimulation applied to the touch sensor compatible with the image displayed in the sub-display region.

2. The display device of claim 1, wherein the driver defines the sub-display region by sensing a length by which the display panel is wound on an outside of the rotary shaft.

3. The display device of claim 2, wherein
   the display panel extends in a direction and is electrically connected to a printed circuit board, protruding beyond the display panel, on both sides of the display panel, and
   the printed circuit board is embedded in the rotary shaft.

4. The display device of claim 3, wherein
   the printed circuit board includes a first protruding portion that protrudes from a side of the display panel, and a second protruding portion that protrudes from another side of the display panel,
   the touch sensor is electrically connected to the first protruding portion, and
   the second protruding portion is electrically connected to the driver.

5. The display device of claim 4, wherein
   the touch sensor is electrically connected to the printed circuit board through a first flexible cable disposed in the housing, and
   the driver is electrically connected to the printed circuit board through a second flexible cable disposed in the housing.

6. The display device of claim 5, wherein
   an end of the first flexible cable is electrically connected to the touch sensor,
   another end of the first flexible cable is electrically connected to the first protruding portion of the printed circuit board,
   an end of the second flexible cable is electrically connected to the driver, and
   another end of the second flexible cable is electrically connected to the second protruding portion of the printed circuit board.

7. The display device of claim 6, wherein the rotary shaft is not visible due to the second surface of the housing.

8. The display device of claim 1, wherein the touch sensor completely seals the second opening of the second surface of the housing.

9. The display device of claim 8, wherein the touch sensor includes:
a first substrate;
touch electrodes disposed on the first substrate; and
a second substrate disposed on the touch electrodes.

10. The display device of claim 9, further comprising:
an air gap disposed between the touch sensor and the sub-display region.

11. The display device of claim 10, wherein the first substrate and the second substrate of the touch sensor each include a rigid material.

12. The display device of claim 11, wherein the first substrate and the second substrate each include glass and/or -quartz.

13. The display device of claim 12, wherein the display panel includes a display substrate including polyimide.

14. A display device comprising:
a housing including:
  a first surface including a first opening, the first surface being disposed on a first side of the housing in a first direction of the housing, and
  a second surface including a second opening, in a second direction of the housing, the second direction intersecting the first direction;
a first forward roll adjacent to the first opening, in the housing;
a second forward roll spaced apart from the first opening in the second direction, in the housing, and adjacent to the second opening;
a third forward roll spaced apart from the second opening in the first direction, in the housing, and adjacent to the second opening;
a rotary shaft disposed in the housing and spaced apart from the third forward roll and the second opening in the second direction; and
a display panel engaging with the rotary shaft, the first forward roll, the second forward roll, and the third forward roll to be inserted into, or retracted from, the housing in the first direction through the first opening, wherein
the display panel includes:
  a main display region, that is retracted from the housing through the first opening to display an image,
  a first sub-region, extending from the first forward roll to the second forward roll,
  a sub-display region, extending from the second forward roll to the third forward roll and overlapping the second opening in a plan view to display an image, and
  a second sub-region, extending from the third forward roll to the rotary shaft and wound on an outside of the rotary shaft.

15. The display device of claim 14, wherein
the display panel has a display surface, and a base surface, opposite to the display surface,
the first forward roll is disposed on the display surface, and
the second forward roll and the third forward roll are disposed on the base surface.

16. The display device of claim 15, wherein the rotary shaft includes a cut groove accommodating an end of the second sub-region of the display panel.

17. The display device of claim 16, wherein the main display region of the display panel is inserted into the housing in case that the second sub-region of the display panel is wound on an outside of the rotary shaft.

18. The display device of claim 17, wherein
the first surface includes a third opening, overlapping the first sub-region in a plan view, and
the first sub-region displays an image through the third opening of the first surface of the housing.

19. The display device of claim 14, further comprising:
a touch sensor completely sealing the second opening,
wherein the touch sensor is transparent with respect to visible light.

20. The display device of claim 19, further comprising:
an air gap disposed between the touch sensor and the sub-display region.

21. The display device of claim 1, wherein
the sub-display region of the display panel is in the housing, and
the image displayed in the sub-display region of the display panel is visible from an outside of the housing by way of the transparent touch sensor.

22. The display device of claim 1, wherein
the image displayed in the sub-display region of the display panel displays a plurality of function buttons, and
the display device is configured so that, upon a user selecting a function corresponding to one of the plurality of function buttons by touching a part of the touch sensor corresponding to the one of the plurality of function buttons displayed in the sub-display region of the display panel, the driver provides the selected function.

23. The display device of claim 1, wherein the display device is configured to:
display the image in the sub-display region of the display panel that is disposed in the housing, the image being visible from an outside of the housing via the transparent touch sensor,
allow a user external to the housing to select an item from the image by touching a portion of the touch sensor that corresponds to the selected item displayed in the sub-display region, and
perform a selected function corresponding to the selected item by actuation of the driver.

* * * * *